(12) United States Patent
Sawalski et al.

(10) Patent No.: US 12,414,556 B2
(45) Date of Patent: Sep. 16, 2025

(54) REPELLANT STRING LIGHT AND RETROFIT ASSEMBLY

(71) Applicant: Lamplight Farms Incorporated, Menomonee Falls, WI (US)

(72) Inventors: Michael Sawalski, Racine, WI (US); Jessica Lindquist, Hartland, WI (US); Jason Tilk, Cleveland, OH (US); Jim Szpak, Cleveland, OH (US); Michael Bilinski, Cleveland, OH (US); Gary Stephan, Cleveland, OH (US); Jeffrey Crull, McFarland, WI (US); William Mathias, Middleton, WI (US); Evan Sparks, Cottage Grove, WI (US)

(73) Assignee: Lamplight Farms Incorporated, Menomonee Falls, WI (US)

(*) Notice: Subject to any disclaimer, the term of this patent is extended or adjusted under 35 U.S.C. 154(b) by 55 days.

(21) Appl. No.: 18/386,670

(22) Filed: Nov. 3, 2023

(65) Prior Publication Data
US 2024/0060637 A1    Feb. 22, 2024

Related U.S. Application Data

(63) Continuation-in-part of application No. 18/228,419, filed on Jul. 31, 2023, which is a continuation of
(Continued)

(51) Int. Cl.
*A01M 29/12*    (2011.01)
*F21S 4/10*    (2016.01)
(Continued)

(52) U.S. Cl.
CPC ............. *A01M 29/12* (2013.01); *F21S 4/10* (2016.01); *F21V 23/001* (2013.01); *F21V 33/0092* (2013.01)

(58) Field of Classification Search
CPC .... A01M 29/12; A01M 13/00; A01M 13/006; F21S 4/10; F21V 23/001; F21V 33/0092; A01N 25/18
(Continued)

(56) References Cited

U.S. PATENT DOCUMENTS

| | | |
|---|---|---|
| 2,468,164 A | 4/1949 | Brewster |
| 4,647,433 A | 3/1987 | Spector |

(Continued)

FOREIGN PATENT DOCUMENTS

| | | |
|---|---|---|
| CN | 1014189626 B | 6/2010 |
| CN | 101526206 B | 7/2010 |

(Continued)

OTHER PUBLICATIONS

Griffin M. Dill, IPM, "Cooperative Extension: Insect Pests, Ticks and Plant Diseases", Pest Management Fact Sheet, 00/00/2011, vol. 5108, Publisher: The University of Maine: https://extension.umaine.edu/ipm/ipddl/publications/5108e/ Published in: Orono.
(Continued)

*Primary Examiner* — Laura K Tso
(74) *Attorney, Agent, or Firm* — Gablegotwals; David G. Woodral

(57) ABSTRACT

A repellent assembly has a light socket connector, a heating receptacle that selectively connects to a replaceable repellent pod that is selectively heated to disperse repellent from the repellent pod, and a remote controlled switch interposing the light socket connector and the heating receptacle to power the heating receptacle on and off.

8 Claims, 19 Drawing Sheets

Related U.S. Application Data application No. 17/101,827, filed on Nov. 23, 2020, now Pat. No. 11,754,279, which is a continuation-in-part of application No. 16/532,128, filed on Aug. 5, 2019, now Pat. No. 10,962,219.

(60) Provisional application No. 62/714,347, filed on Aug. 3, 2018.

(51) Int. Cl.
  *F21V 23/00* (2015.01)
  *F21V 33/00* (2006.01)
(58) Field of Classification Search
  USPC .................................................. 362/249.06
  See application file for complete search history.

(56) References Cited

U.S. PATENT DOCUMENTS

| | | | |
|---|---|---|---|
| 5,513,081 | A | 4/1996 | Byers |
| 5,700,430 | A | 12/1997 | Bonnema et al. |
| 5,967,644 | A | 10/1999 | Pan |
| 6,033,212 | A | 3/2000 | Bonnema et al. |
| 6,044,202 | A | 3/2000 | Junkel |
| 6,109,765 | A | 8/2000 | Blanton |
| 6,935,762 | B2 | 8/2005 | Van Dyn Hoven |
| 7,318,659 | B2 | 1/2008 | Demarest et al. |
| 7,503,675 | B2 | 3/2009 | Demarest et al. |
| 7,581,851 | B2 | 9/2009 | Wang |
| 7,618,151 | B2 | 11/2009 | Abbondanzio et al. |
| 7,641,364 | B2 | 1/2010 | Abbondanzio et al. |
| 7,815,328 | B2 | 10/2010 | Van Dyn Hoven |
| 7,835,631 | B2 | 11/2010 | Wang |
| 8,480,248 | B2 | 7/2013 | Demarest et al. |
| 8,494,351 | B1 | 7/2013 | Hayes |
| 8,579,453 | B1 | 11/2013 | Cohen et al. |
| 8,616,735 | B2 | 12/2013 | Van Dyn Hoven |
| 8,772,675 | B2 | 7/2014 | Juarez |
| 9,497,958 | B2 | 11/2016 | Shapiro et al. |
| 9,591,843 | B2 | 3/2017 | Formico et al. |
| 9,968,080 | B1 | 5/2018 | Van Kleef et al. |
| 10,962,219 | B2 * | 3/2021 | Sawalski ............... F21V 23/001 |
| 11,754,279 | B2 * | 9/2023 | Sawalski ............... F21V 23/001 362/96 |
| 12,161,107 | B2 * | 12/2024 | Ressler ............... A01M 1/2038 |
| 2001/0012495 | A1 | 8/2001 | Furner et al. |
| 2005/0195600 | A1 | 9/2005 | Porchia et al. |
| 2006/0219962 | A1 | 10/2006 | Dancs et al. |
| 2006/0221614 | A1 | 10/2006 | Van Dyn Hoven |
| 2007/0109763 | A1 | 5/2007 | Wolf et al. |
| 2007/0109782 | A1 | 5/2007 | Wolf et al. |
| 2007/0121319 | A1 | 5/2007 | Wolf et al. |
| 2007/0133206 | A1 | 6/2007 | Demarest et al. |
| 2008/0112857 | A1 | 5/2008 | McKenzie-Jones et al. |
| 2008/0144325 | A1 | 6/2008 | Van Dyn Hoven |
| 2013/0114244 | A1 | 5/2013 | Formico et al. |
| 2014/0092589 | A1 | 4/2014 | Van Dyn Hoven |
| 2014/0268651 | A1 | 9/2014 | Mumma et al. |
| 2015/0144712 | A1 | 5/2015 | Formico et al. |
| 2015/0144713 | A1 | 5/2015 | Formico et al. |
| 2015/0217016 | A1 | 8/2015 | McKay et al. |
| 2018/0348108 | A1 | 12/2018 | Khazaai et al. |
| 2024/0027062 | A1 * | 1/2024 | Sawalski ............... F21V 23/001 |

FOREIGN PATENT DOCUMENTS

| | | | | |
|---|---|---|---|---|
| CN | 203384946 | U | 1/2014 | |
| CN | 203718399 | U | 7/2014 | |
| CN | 203963798 | U | 11/2014 | |
| CN | 204592954 | U | 8/2015 | |
| CN | 204648023 | U | 9/2015 | |
| CN | 205756835 | U | 12/2016 | |
| CN | 107883229 | A | 4/2018 | |
| CN | 207539677 | U | 6/2018 | |
| IN | 1282MUMNP2009 | A | 3/2010 | |
| WO | WO-9858692 | A1 * | 12/1998 | .......... A01M 1/2077 |
| WO | 2006126139 | A1 | 11/2006 | |
| WO | 200920568 | A1 | 2/2009 | |
| WO | 201060239 | A1 | 6/2010 | |

OTHER PUBLICATIONS

"Old unproven ultrasonic repellant emerges in a new form", Mosquito Repellent Apps: Do Ultrasonic Sound Devices Work?, 00/00/2019, Publisher: MosquitoReviews.com.

Chen CD, Azahari AH, Saadiyah I, Lee HL, "Preliminary study on the effectiveness of mosquito repelling lamp, E Da.", Trop Biomed., Dec. 24, 2007, pp. 89-91, vol. 24, No. 2, Publisher: PubMed; https://www.ncbi.nlm.nih.gov/pubmed/18209714.

Bentley, Michael T., et al., "Response of Adult Mosquitoes to Light-Emitting Diodes Placed in Resting Boxes and in The Field", Journal of the American Mosquito Control Association, 00/00/2009, pp. 285291, vol. 25, No. 3, Publisher: The American Mosquito Control Association, Inc, Published in: US; https://pubmed.ncbi.nlm.nih.gov/19852218/.

Fiona McDonald, "This is The Type of Light Bulb to Use if You Want to Avoid Attracting Insects", https://www.sciencealert.com/scientists-have-figured-out-the-type-of-light-bulb-to-use-if-you-want-to-avoid-insects, Feb. 22, 2016, Publisher: Science Alert, Published in: US.

"Enhancement of mosquito trapping efficiency by using pulse width modulated light emitting diodes", Jan. 6, 2017, vol. 7, No. 40074, Publisher: Scientific Reports, Published in: US; https://www.nature.com/articles/srep40074.

Wikipedia, "Electronic pest control", https://en.wikipedia.org/wiki/Electronic_pest_control, Unknown, Published in: US.

\* cited by examiner

REPELLANT STRING LIGHT AND RETROFIT ASSEMBLY

CROSS-REFERENCE TO RELATED CASES

This application is a continuation in part which is continuation of U.S. patent application Ser. No. 17/101,827 filed on Nov. 23, 2020, which is a continuation-in-part of U.S. Pat. No. 10,962,219 filed on Aug. 5, 2019, which claims the benefit of U.S. provisional patent application Ser. No. 62/714,347, filed on Aug. 3, 2018 entitled REPELLANT STRING LIGHT, the contents of which are hereby incorporated by reference.

FIELD OF THE INVENTION

This disclosure relates to outdoor devices having multiple uses. In particular, but not by way of limitation, this disclosure relates to devices providing light and dispersal of scents and/or repellants.

BACKGROUND OF THE INVENTION

Outdoor party lights or string lights have become common for lighting or decorative purposes. These may be based upon low wattage lights such as LEDs (light emitting diodes). However, their utility has remained static for some time and they have not generally been put to further uses.

Dispersion of repellants via electrical power, or plug-in devices, can enhance delivery of effective repellants. However, utility may be limited where battery power is required or where location of use has been restricted to locations very near an outlet. Additionally, for maximum effect with a repellant, it should be placed where it has the greatest exposure to the area sought to be protected.

What is needed is a system and method for addressing the above and related concerns.

SUMMARY OF THE INVENTION

The invention of the present disclosure, in one aspect thereof, comprises a repellent assembly including a receiver housing with a light socket connector, a heating receptacle electrically connected to the receiver housing, the heating receptacle having an internal electric heater and a fitting for selectively receiving a repellent pod assembly in a position proximate the electric heater to heat the repellent pod assembly to disperse repellent, and a remote-controlled switch in the receiver housing that switches power from the light socket connector to the heating receptacle.

In some embodiments, the heating receptacle further comprises a body defining a sleeve, and a collar rotatably fitted into the sleeve and defining the fitting for selectively receiving the repellent pod assembly in the position proximate the electric heater to heat the repellent pod assembly to disperse repellent. A window may be defined in the sleeve allowing user contact with the collar. The collar may have a textured outer circumferential surface contactable through the window.

In some cases, a length of power cord connects the heating receptacle to the receiver housing.

The remote-controlled switch may comprise a solid-state switch. The solid-state switch may comprise a wireless communications capable microcontroller. The repellant assembly may include a remote control to provide communication to the microcontroller to power on and power off the heating receptacle.

The invention of the present disclosure, in another aspect thereof, comprises a repellent assembly having a light socket connector, a heating receptacle that selectively connects to a replaceable repellent pod that is selectively heated to disperse repellent from the repellent pod, and a remote controlled switch interposing the light socket connector and the heating receptacle to power the heating receptacle on and off.

The heating receptacle may further comprise a body having a top connected to a base to define an interior, a body floor with a sleeve descending therefrom, the sleeve providing a fitting for connecting to the replaceable repellent pod, an aperture defined in the body floor, and an electric heater affixed near the aperture in the body floor.

One of the body top and body base may be ventilated to allow repellent to escape from the interior. The sleeve may contain a collar rotatably fitted therein, the collar defining a threaded connection proximate the aperture in the body floor. The sleeve may define an opening that allows user contact with the collar and the collar defines an outer textured circumferential surface proximate the opening. The collar may retain the replaceable repellent pod in the threaded connection such that a wick from the replaceable repellent pod is held proximate the electric heater.

In some embodiments, the repellent assembly further comprises a receiver housing that contains the remote-controlled switch. The remote-controlled switch may comprise a solid-state device that receives wireless commands from a wireless remote control. The repellent assembly may further comprise an indicator on the receiver housing that is illuminated by the remote controlled switch when the heating receptacle is powered on.

The invention of the present disclosure, in another aspect thereof, comprises a repellent system including a power cord having a plug for an outlet, a plurality of light sockets powered by and attached to the cord, and at least one repellant dispersion port supplying power provided by the power cord to a resistive heating element in proximity to a repellant contained in a fluid pod, the repellant delivered from the bulb for evaporation by the resistive heating element by a wick placed into the repellant in the fluid pod. A dispersal of the repellant provides a repellant zone from the at least one repellant dispersion port to a ground level below repellant dispersion port.

In some embodiments, the at least one repellant dispersion port connects to the power cord via one of the plurality of light sockets. The at least one repellant dispersion port may be activated and deactivated by remote control.

DETAILED DESCRIPTION OF THE PREFERRED EMBODIMENTS

Figure 1:
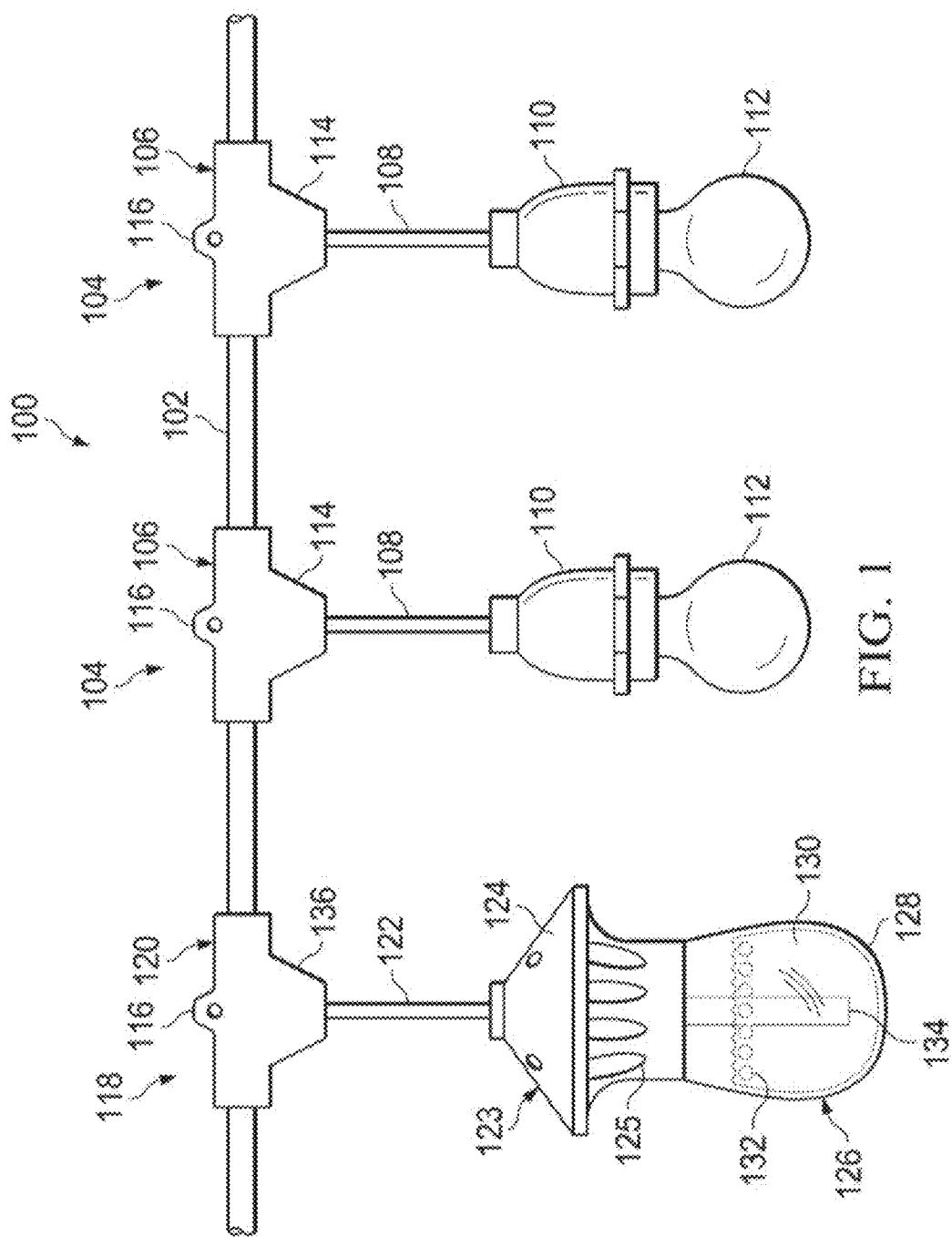
FIG. 1 is a close-up elevational view of a portion of a lighting and dispersal system according to aspects of the present disclosure.

Referring now to FIG. 1, a close-up elevational view of a portion of a lighting and dispersal system 100 according to aspects of the present disclosure is shown. The system 100 is a combination light string and liquid volatilization and dispersal mechanism. Systems of the present disclosure may disperse repellants, scents, oils, chemicals etc., while providing lighting or decorative effects. The system 100 provides a power cord 102 with a plurality of light receptacles 104 spaced along the cord 102. The light receptacles 104 may further each comprise a cord junction 106 with a segment of transverse power cord 108 leading from the junction to a light socket 110. In some embodiments, the light socket 110 is affixed directly to the cord junction 106 (i.e., there is no transverse power cord 108).

The junction 106 provides an internal electrical splice to the power cord 102 which may power a light bulb 112 inserted into the socket 110. The junction 106 may comprise a body 114 that may be constructed of an insulating polymer or another material. The junction 106 may comprise a hang loop 116 defined in or attached to the body 114.

In various embodiments, the light socket 110 may comprise a screw in base such as an E26/E27 base or another base such as E12, E14, E17, E39/E40. In some embodiments, the light socket 110 may comprise a bayonet or press-in style socket. The light bulb 112 may comprise an incandescent light bulb, a compact fluorescent (CFL) bulb, or a light emitting diode (LED) in a form factor to fit the associated socket 110. In one embodiment, the light bulb 112 comprises a 2-watt LED.

In addition to one or a plurality of light receptacles 104, the system 100 comprises one or a plurality of repellant dispersion ports 118. The repellant dispersion ports 118 may each comprise a cord junction 120 connecting a transverse power cord segment 122 to a heating receptacle 123. The cord junction 120 comprises a body 136 covering an electrical splice from the power cord 102 to supply power to the heating receptacle 123. The body 136 may comprise an insulating polymer. In some embodiments, the heating receptacle 123 is affixed directly to the cord junction 120 (i.e., there is no transverse power cord 122).

The heating receptacle 123 may attach selectively to a repellant assembly pod 126. The pod 126 may removably inserted into or attach to the receptacle 123 with a threaded connection, a turn and lock connected, a press fit mechanism, a bayonet style connected, a magnetic fitting, or another operable mechanism. The heating receptacle 123 applies heat to the repellant assembly pod 126 to volatilize and disperse the contents of the pod 126. To that end, ventilation ports 125 may be defined in a body 124 comprising the heating receptacle 123. The body 124 may comprise a polymer or other suitable material.

The pod 126 may comprise a fluid reservoir 128 that contains a quantity of a pest or insect repellant product 130 such as a synthetic pyrethroid, metofluthrin, meperfluthin, or other product. The fluid reservoir 128 may also contain scents or other agents. The pod 126 may be provided to the consumer pre-filled and may or may not be serviceable for refilling by the consumer (e.g., the pod 126 may be considered a disposable item). The fluid reservoir 128 may comprise an opaque or tinted polymer. In some embodiments, the fluid reservoir 128 may be clear or at least translucent to allow the consumer to ascertain the amount of repellant 130 remaining in the reservoir 128.

Figure 6:
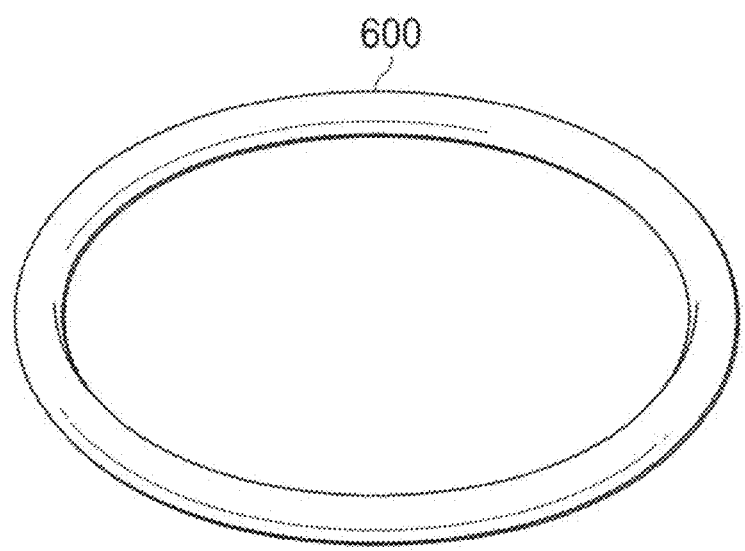
FIG. 6 is a perspective view of a repellant level indicator float ring according to aspects of the present disclosure.

In some cases, various lighting conditions and combinations of the appearance of the repellant 130 and the fluid reservoir 128 may render determination of the remaining amount of repellant 130 difficult. In some embodiments, a number of floats 132 may be provided in the repellant 130. In the case of small discrete floats 132 or beads, surface tensions of the repellant 130 and the geometry of the meniscus that forms at the top of the repellant layer results in the floats 132 tending to remain near the sides of the repellant bulb 128 such that the fluid level may be easily determined. In other embodiments, a toroidal ring-type float (600, FIG. 6) may be utilized.

Figure 2:
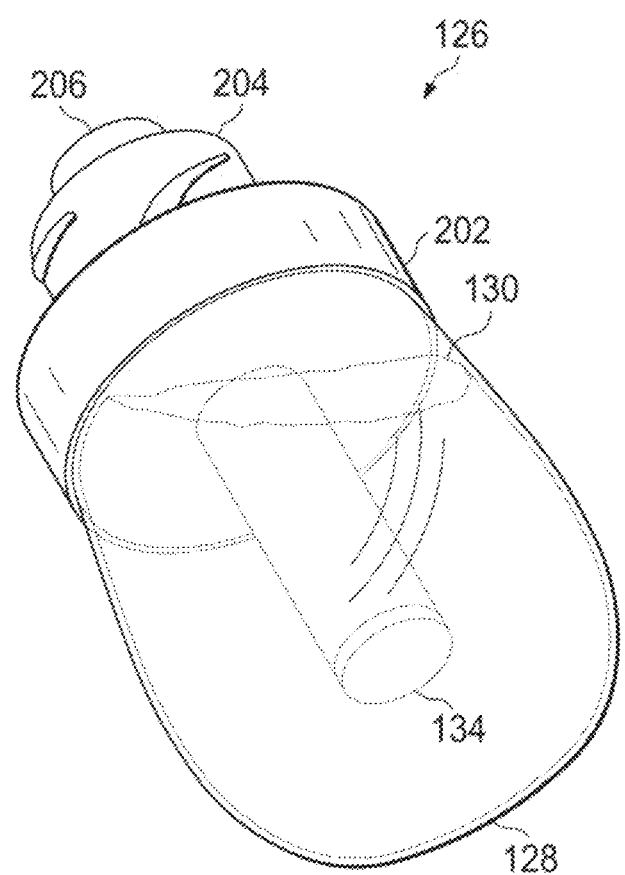
FIG. 2 is a perspective view of a repellant assembly according to aspects of the present disclosure.

Referring now also to FIG. 2 a perspective view of the repellant assembly 126 removed from the heating receptacle 123 is shown. It can be seen that no floats or fluid level indicators are provided in the view of FIG. 2 and that the fluid reservoir 128 is substantially full as it would appear before use (or after refill). A cap 202 may affix to the top of the fluid reservoir 128 to prevent spillage of the repellant 130. The cap 202 may provide a fitting 204 for selective attachment into the heating receptacle 123. Here the fitting 204 is illustrated as a threaded fitting. A top port 206 may be provided for passage or evaporation of the repellant 130. In one embodiment, a top of the wick 134 serves as a top port or evaporation pad.

Figure 3:
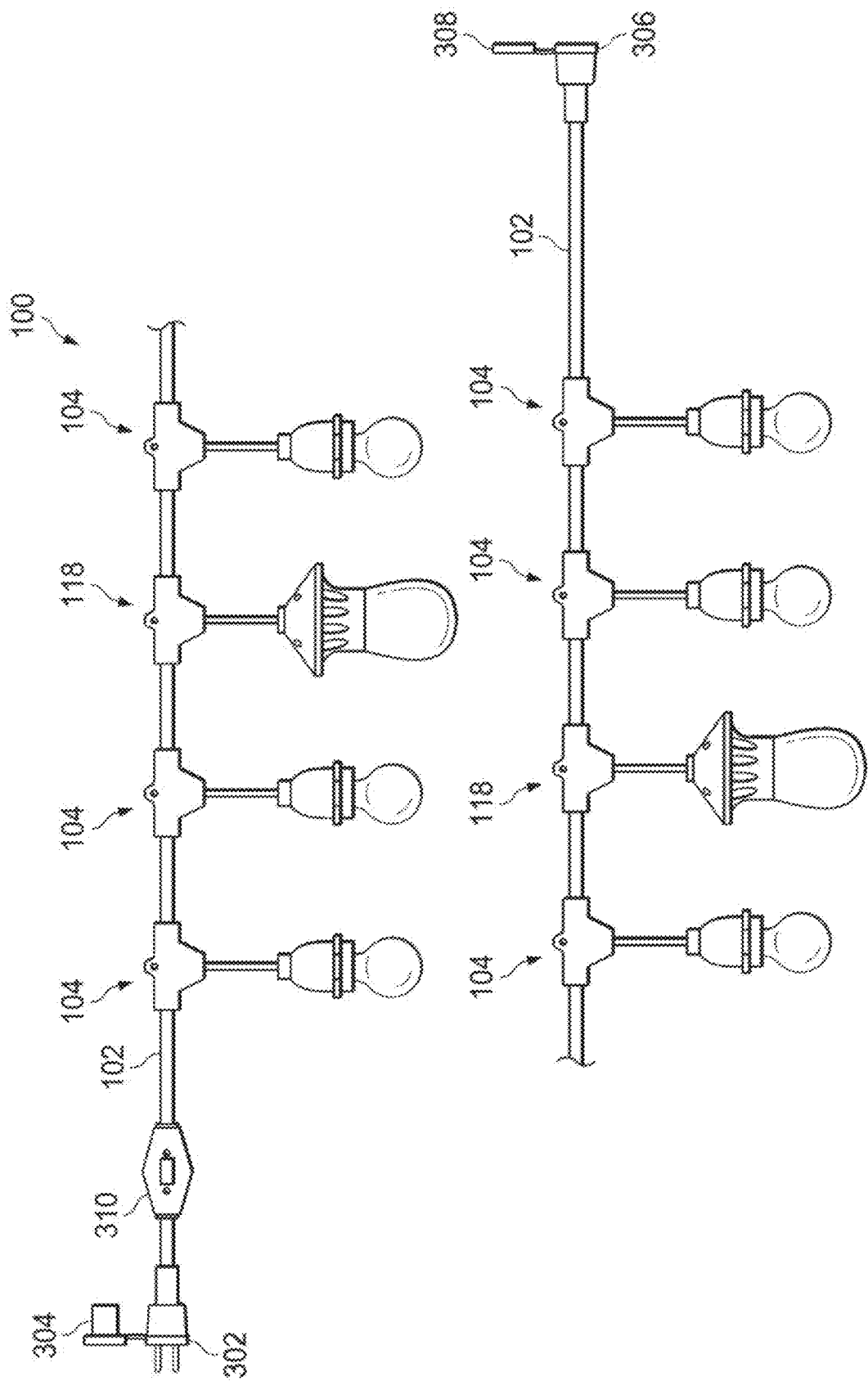
FIG. 3 is an elevational view of a lighting and dispersal system according to aspects of the present disclosure.

Referring now to FIG. 3 an elevational view of the lighting and dispersal system 100 is shown. FIG. 3 is not to scale, nor does it necessarily reflect the total number of light receptacles 104 and repellant dispersion ports 118 associated with the system 100. In some embodiments, there may be equal numbers of each. However, the repellant dispersion ports 118 may provide a wide enough effective repellant area that a relatively greater number of light receptacles 104 may be appropriate.

In one embodiment, power cord 102 may be around 36 feet in length. A total of three repellant dispersion ports 118 are provided along the power cord 102 with a total of twelve light receptacles 104. Various embodiments may be provided with a standard outlet plug 302 (e.g., a standard US/Canada or other type of plug), possibly with an attached cover 304. At an opposite end a standard female outlet 306 may be provided, possibly with an attached cover 308. A power switch 310 may be provided as well. The outlet 306 allows for multiple systems 100 to be chained together, or for the system 100 to provide "downstream" power to other devices.

Figure 4:
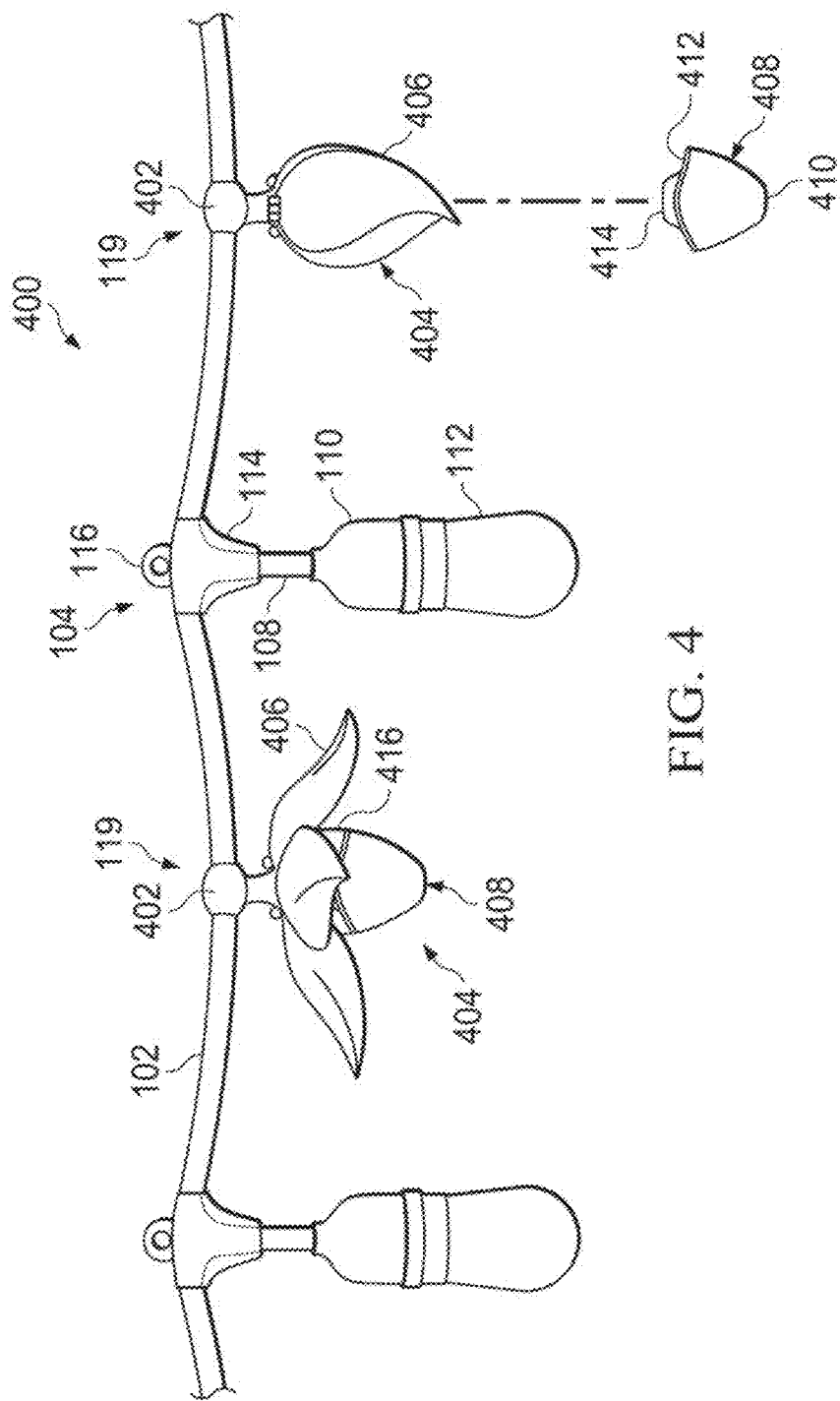
FIG. 4 is a close-up perspective view of another embodiment of a lighting and dispersal system according to aspects of the present disclosure.

Referring now to FIG. 4, a close-up perspective view of another embodiment of a lighting and dispersal system 400 according to aspects of the present disclosure is shown. The system 400 shares many components in common with the system 100 previously described. A power cord 102 provides a common source of power. One or more light receptacles 104 may be provided at various locations along the power cord 102. The power cord may have electrical connections at either end (not shown) as well as a power switch (not shown).

The system 400 comprises one or more repellant dispersion ports 119 that differ in some respects from the repellant dispersion ports 118 discussed previously. The repellant dispersion ports 119 comprise junctions 402 providing an internal power splice and affixing the repellant dispersion port 119 to the power cord 102. Here, the junction 402 also provides a heating element for promotion of evaporation of the associated repellant and other chemicals. A covering 404 selectively surrounds a repellant assembly 408 and heating receptacle 416. In some embodiments, the covering 404 resembles a flower with openable petals 406. The petals 406 may be opened manually to reveal the repellant assembly 408, they may open under a power mechanism, or they may be configured with a low enough mass and loose enough connections to be able to displace under light breezes to reveal the repellant assembly 408.

The repellant assembly 408 may contain any of the aforedescribed repellants or other ingredients, and may be refillable or disposable. As show in the inset, the repellant assembly 408 may include a fluid pod 410 that contains the repellant or other ingredients. The fluid pod 410 may be provided with a cap 412 that may provide a fitting 414 for attachment and detachment from the heating receptacle 416. A wick (not visible) may provide a pathway for movement of the repellant from the fluid pod 410 for dispersion/evaporation by the heating receptacle 416.

Figure 5:
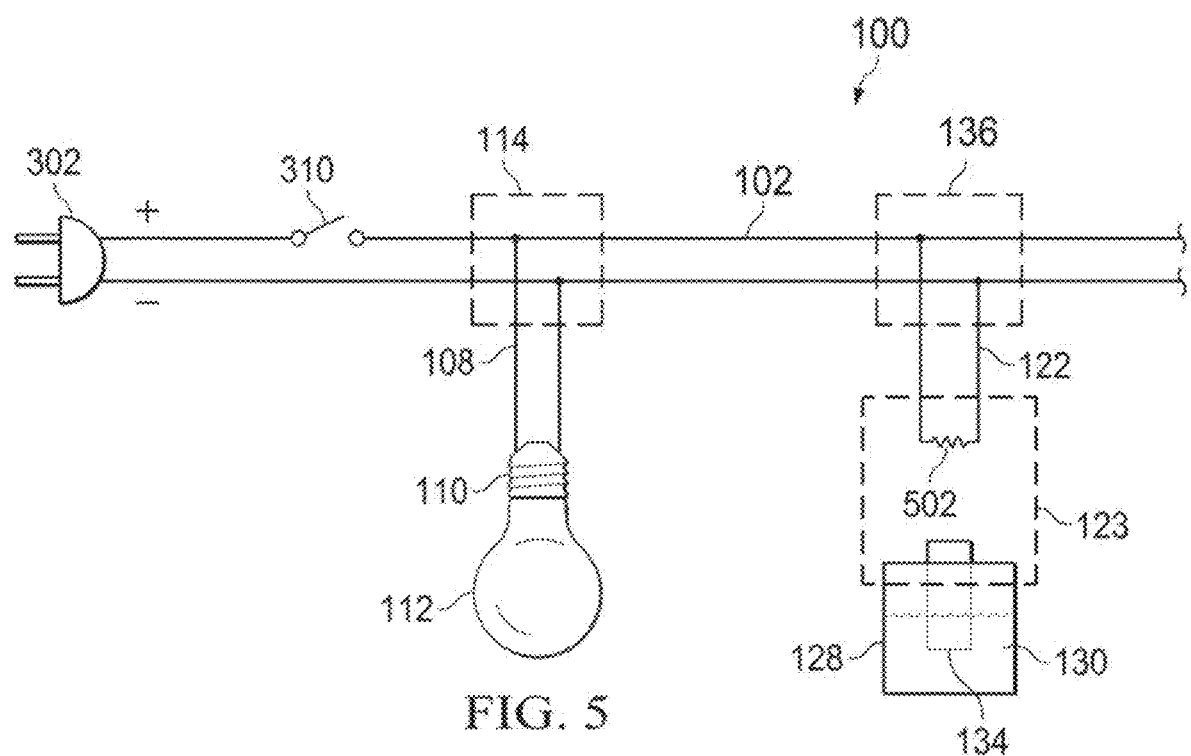
FIG. 5 is a simplified electrical schematic diagram of a lighting and dispersal system according to aspects of the present disclosure.

Referring now to FIG. 5 a simplified electrical schematic diagram of a lighting and dispersal system according to aspects of the present disclosure is shown. FIG. 5 corresponds particularly to the system 100. However, those of skill in the art will appreciate that the schematic is easily adapted to the system 200, or any of the additional embodiments discussed herein. The plug in 302 is shown providing power to the power cord 102 shown as positive and negative leads. Switch 310 controls the positive side of power cord 102. Junction body 114 contains the connecting nodes for transverse power cord 108 to supply current and voltage to light socket 112 and bulb 112.

Junction body 136 contains nodes connecting power cord 102 to transverse power cord 122 leading to the heating receptacle 123. A resistive heating element 502 exposes wick 134 (or at least the repellant) to elevated temperature to gasify or evaporate the same. In some embodiments the wattage of the resistive heating element 502 is less than 8 watts. In another embodiment, the wattage of resistive element 502 is 5 watts or about 5 watts. The temperature provided by the resistive heating element 502 may be from about 120 C to about 140 C.

It should be understood that the arrangement of the components shown in FIG. 5 may be replicated as far as necessary to properly configure each associate lighting receptacle and repellant dispersion port. The system 100 may be configured with the appropriately rated components to operate from about 100V to about 240V. It should also be understood that, in some embodiments, lighting and repellant functions are isolated along the power cord 102. In other words, in some embodiments, the light receptacles 104 are divorced from dispersion of any repellants or other chemicals and are, instead, dedicated to providing only light. Correspondingly, in some embodiments, repellant dispersion ports 118 do not provide any useable light.

In operation, the systems described herein (e.g., system 100 and system 400) may be installed such that they are somewhere above ground level to allow maximum effectiveness of the repellant. In various embodiments 4 feet to 12 feet provides an optimum effect and a repellant zone from mounting level all the way to the ground. The systems may be strung from a roof, fence, wall, tree, dedicated poles, or other structures. The systems 100, 400 are also described as being powered by a household outlet. However, it should be understood they may also be powered by batteries, generators, and other portable power sources.

Figure 7:
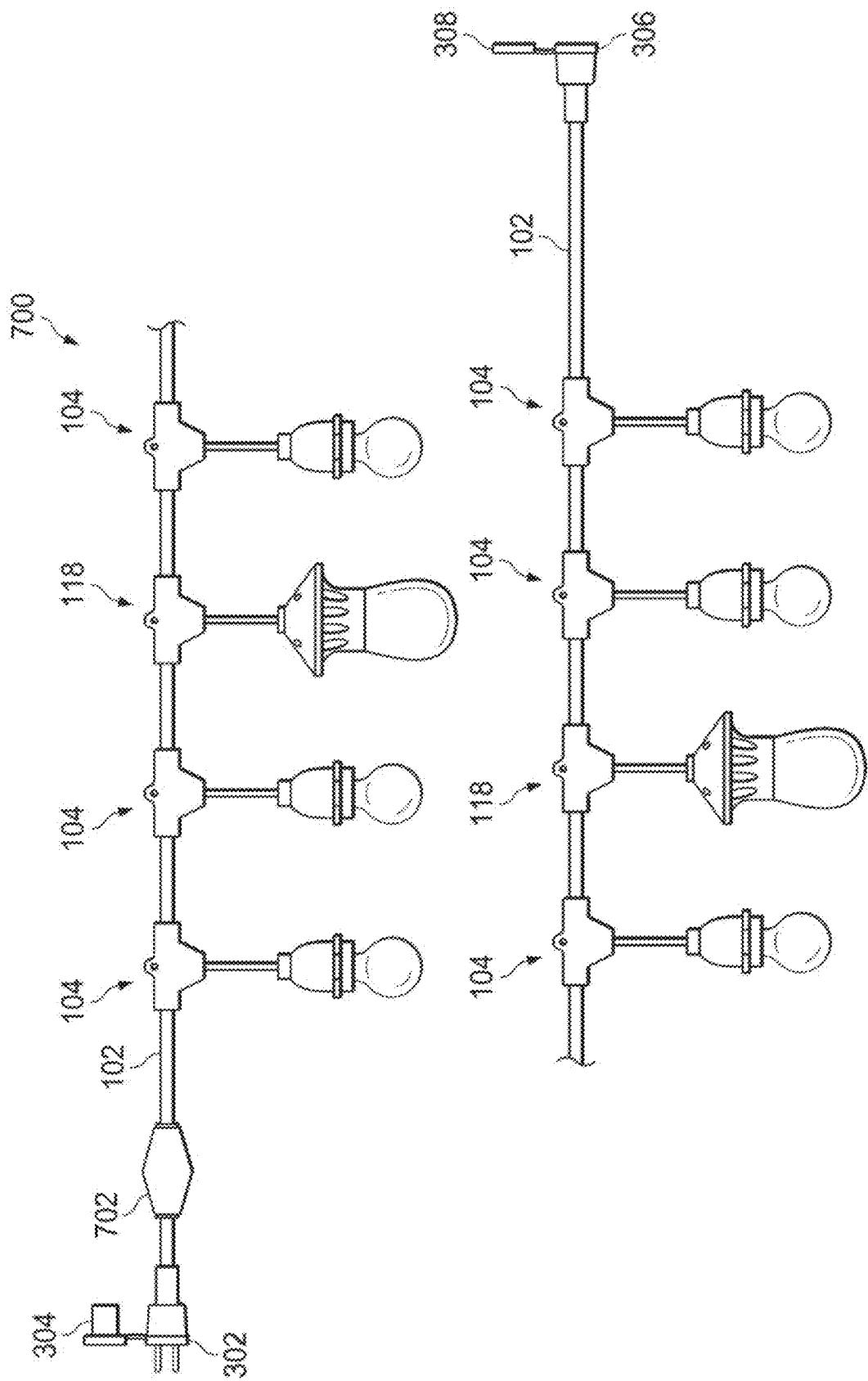
FIG. 7 is an elevational view of another embodiment of a lighting and dispersal system according to aspects of the present disclosure.

Referring now to FIG. 7, an elevational view of another embodiment of a lighting and dispersal system 700 according to aspects of the present disclosure is shown. The system 700 is similar to the system 100 described above but does not have a manual power switch (such as power switch 310). The system 700 may power on in response to being connected to power, via plug 302, for example. In some embodiments, a delay circuit, warmup circuit, current limiting, circuit and/or power conditioning circuit as known in the art may be provided in a circuit enclosure 702. Some embodiments to not provide such circuitry nor the enclosure 702 but such circuitry may still be included with the specific light receptacles 104 and/or repellant dispersion ports 118 if and as needed. Fuses, as known in the art, may also be include if and where needed.

Figure 8:
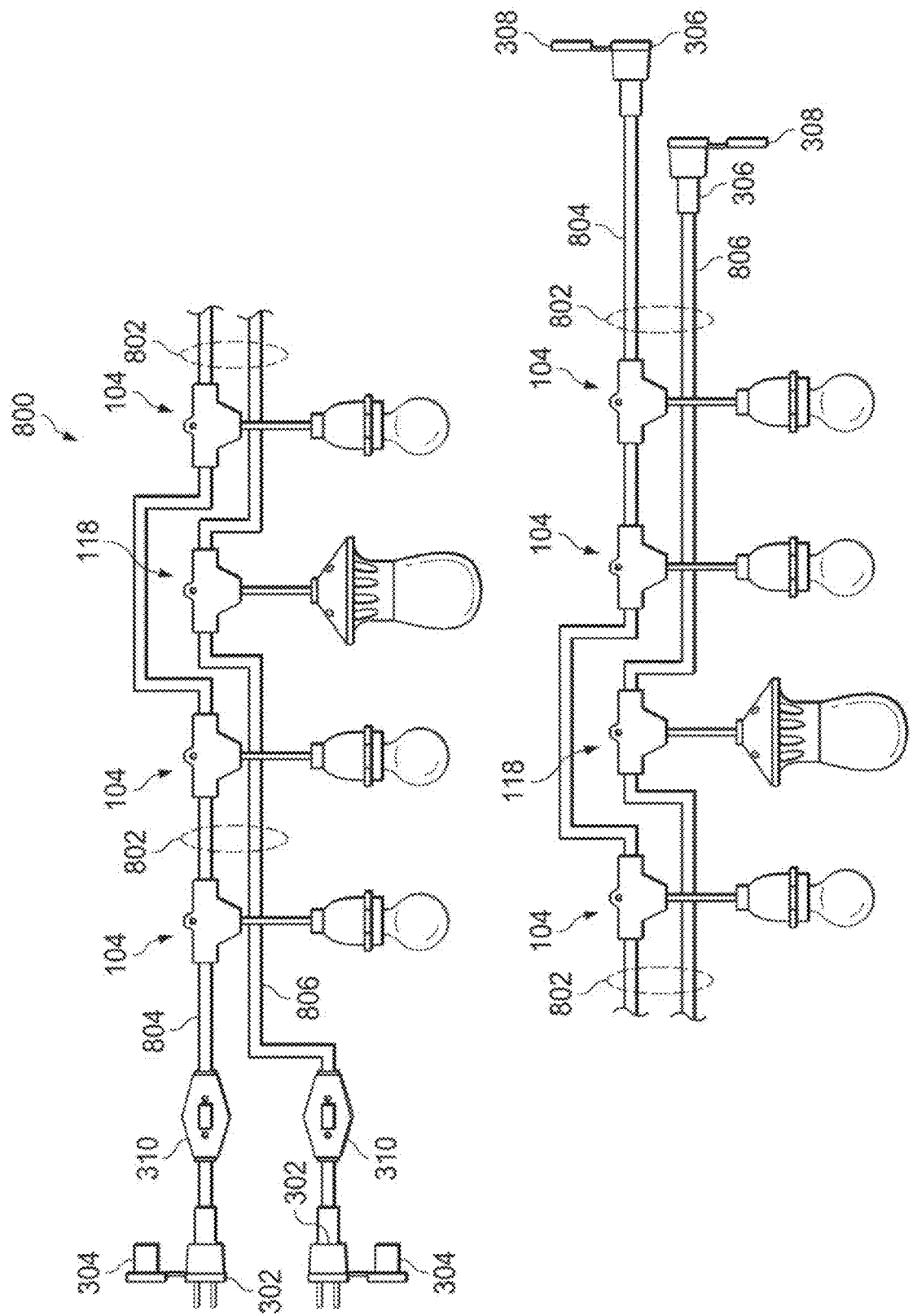
FIG. 8 is an exploded plan diagram of another embodiment of a lighting and dispersal system according to aspects of the present disclosure.

Referring now to FIG. 8 an exploded plan diagram of another embodiment of a lighting and dispersal system 800 according to aspects of the present disclosure is shown. The system 800 comprises both lighting and repellent dispersion on a single cord 802 but the functions of both are electrically separated or isolated. The system 800 comprises a first power line 804 that supplies power for a plurality of light receptacles 104 and a second power line 806 that supplies power for a plurality of repellant dispersion ports 118. The lines 804, 806 may be physically bound and/or wound together along medial portions thereof. They may have a separate outer wrapper (not shown) for weather resistance, insulation, appearance, and/or ease of handling. At ends of the lines 804, 806 they may split apart into separate plugs 302 and may separate into a pair of receptacles or outlets 306. Cord junctions (e.g., 106, 120, FIG. 1) and/or hang loops (e.g., 116, FIG. 1) and possibly other components may be available outside any wrapper or covering of the power lines 804, 806 as needed.

In some embodiments, each line 804, 806 has its own manual switch 310 such that dispersion and lighting functions are separately controllable. In other embodiments, one or both of the power lines 804, 806 may be provided with no manual switch 310 such that they are controlled by connection to power. In such case, either line 804, 806 may be provided with whatever adjunct circuitry may otherwise be needed, as with the system 700 (e.g., delay circuit, warmup circuit, current limiting, circuit and/or power conditioning, etc.).

Figure 9:
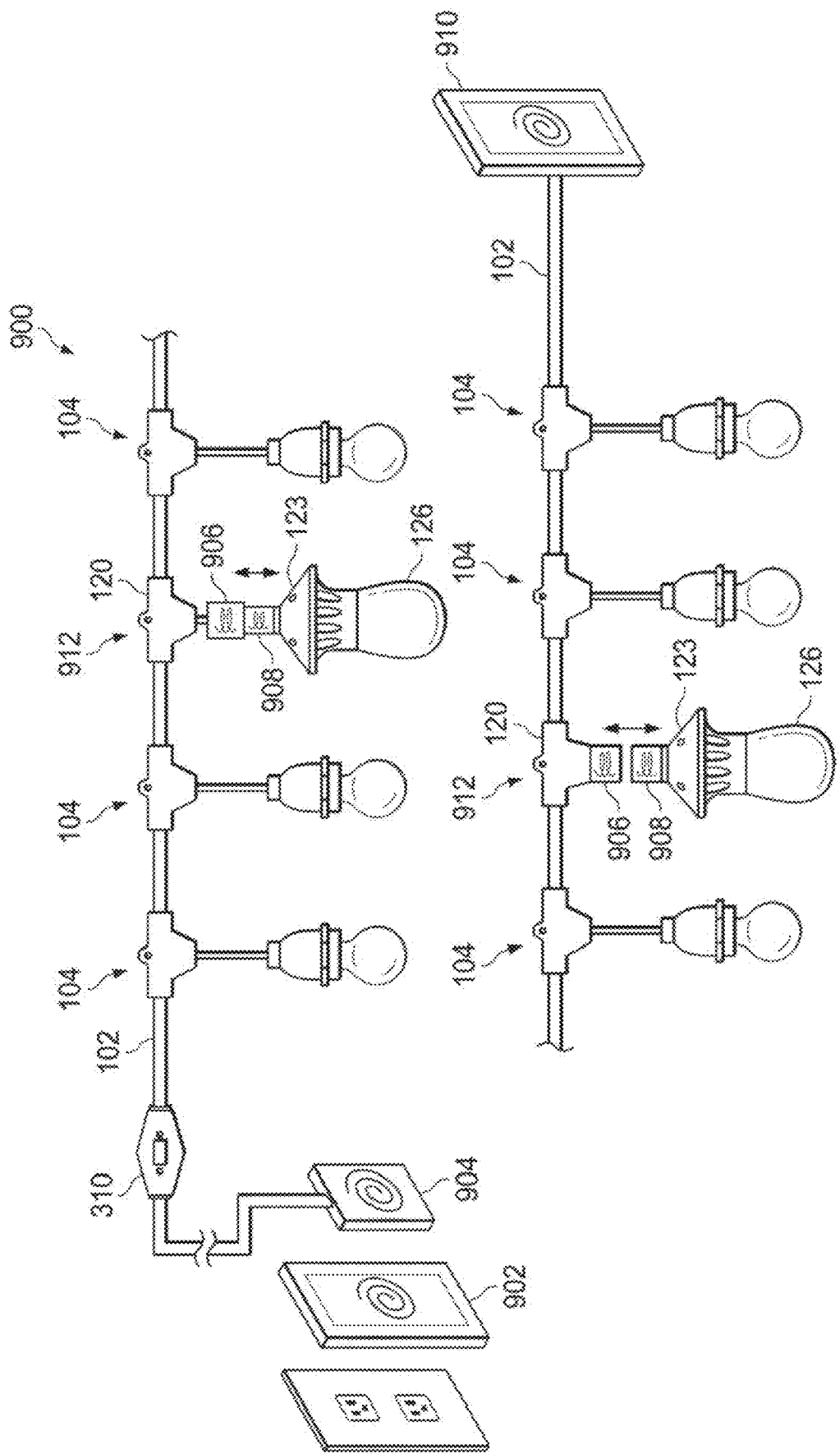
FIG. 9 is an elevational view of another embodiment of a lighting and dispersal system according to aspects of the present disclosure.

FIG. 9 is an elevational view of another embodiment of a lighting and dispersal system 900 according to aspects of the present disclosure. The system 900 is similar to the system 100 discussed above but utilizes wireless power couplings. It should also be understood that wireless power couplings can be utilized with any system according to the present disclosure. As illustrated, the system 900 may utilize a plug-in coil 902 that connects to household power. A line coil 904 is placed onto, in, or near the line coil 904 such that electric power is transferred thereto, and into the power cord 102. It should be understood that any wireless power transfer technology as is known in the art may be employed in this context. Nonlimiting examples include inductive, capacitive, and magnetodynamic coupling.

Dispersion ports 912 may also be adapted to utilize wireless power transfer but may otherwise operate similarly to dispersion ports 118 described above. For example, the ports 118 as shown in FIG. 8 utilize an inner coil coupling 908 affixed to heating receptacle 123 that fits into an outer coil coupling 906 that is electrically connected to the power cord 102 (possibly via cord junction 120). In the illustrated embodiment, the couplings 906, 908 provide for wireless power transfer from the power cord 102 to the receptacle 123 and also physically retain the receptacle 123 and associated pod 126 in place on the cord 102 and/or junction 120. Wireless power transfer may be any suitable known protocol or connection type (e.g., magnetic, inductive, etc.). The physical retention may be via interference fit, friction fit, securement latch, bayonet coupling, screw coupling, other mechanism.

Opposite from the line coil 904 on the power cord 102 may be an outlet plug in 910. This may extend the output provided by plug in coil 902 such that additional light/repellant strings or other devices can be daisy chained to the system 900. The system 900 may or may not include a manual power switch 310 and/or other power conditioning and needed operational circuitry as is known in the art.

It should also be understood that the light receptacles 104 may be configured to utilize wireless power couplings similar to the manner in which dispersion ports 118 (e.g., FIG. 1) are configured as dispersion ports 912.

Figure 10:
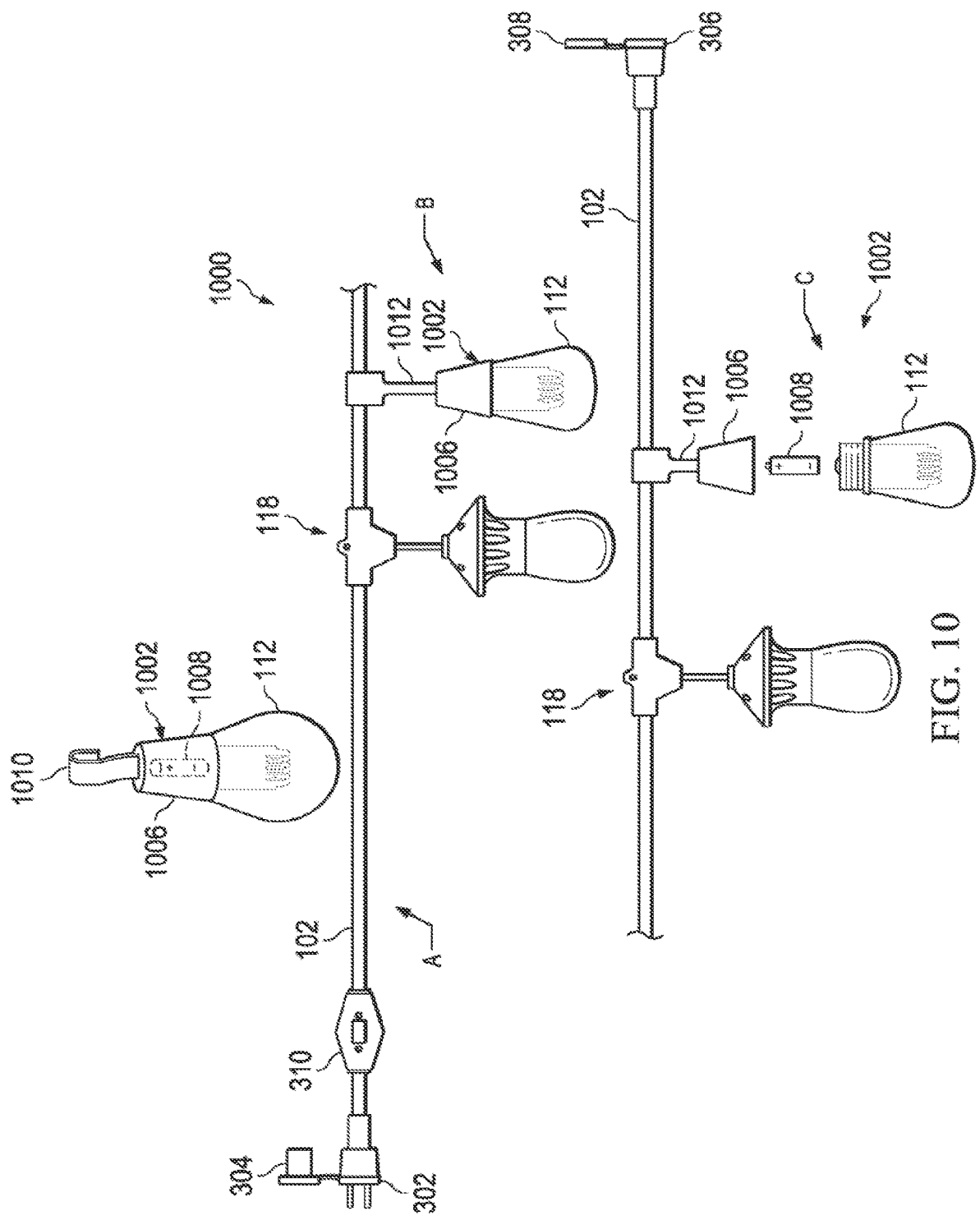
FIG. 10 is an exploded plan diagram of another embodiment of a lighting and dispersal system according to aspects of the present disclosure.

Referring now to FIG. 10, an exploded plan diagram of another embodiment of a lighting and dispersal system 1000 according to aspects of the present disclosure is shown. The system 1000 utilizes a power cord 102 (which may be equipped as in FIG. 3, or according to any other embodiment described herein) that has only repellent dispersion ports 118 rather than dispersion ports 118 and light receptacles. In another embodiment, the system 1000 has a cord 102 provided with light receptacles as well (e.g., 104, FIG. 1) but additional lighting is desired. The additional lighting may be the same or different from that provided via the receptacles 104 described above and may be provided via one or more clip-on lights 1002.

The clip-on lights 1002 may comprise a light bulb 112 as described above. The bulb 112 may be selectively retained and provided power by a housing 1006 with an internal battery 1008. The battery 1008 may be any battery providing a suitable voltage for the bulb 112 (whether LED or otherwise) and may be based on any suitable chemistry (e.g., alkaline, lithium ion, etc.). In some embodiments, the battery 1008 is rechargeable.

The housing 1006 has a clip 1010 affixed thereto that selectively retains the clip-on light 1002 on the cord 102. The clip may be sized for an interference fit or to "snap on" to the cord 102. The clip 1010 may comprise a polymer or another suitable material. It may also vary in size or length to provide proper positioning of the bulb 112 relative to the cord 102 and/or components of the repellant dispersion ports 118. Position A illustrates a relatively short clip 1010 while positions B and C illustrate a longer clip 1012 (which may otherwise be functionally identical to clip 1010).

Position C also illustrates a clip-on light 1002 in a disassembled configuration. Here the battery 1008 may be seen outside the housing 1006 and the bulb 112 detached from the housing 1006. It should be understood that internal springs for secure contact with the battery 1008 and circuitry as is known in the art for operation of the bulb 112 by the battery 1008 are included. The bulb 112 may be physically affixed to the housing 1006 by any suitable mechanism such as a bayonet style attachment, a friction fit, an interference fit, a press fit, a screw in fit, etc.

As described above the systems described herein (e.g., 100, 400, 700, 800, 900) may be installed such that they are somewhere above ground level to allow maximum effectiveness of the repellant. In a specific embodiment, these may be installed such that the repellant dispersion ports are a maximum of about 100 feet from the ground or support surface. In such case, each repellant dispersion port (e.g., 118) provides approximately a 330 square foot zone of protection from the respective port 118 down to the ground or support surface. Under mild conditions (e.g., low wind or no wind) the area of protection has a roughly circular appearance viewed from above.

Figure 11:
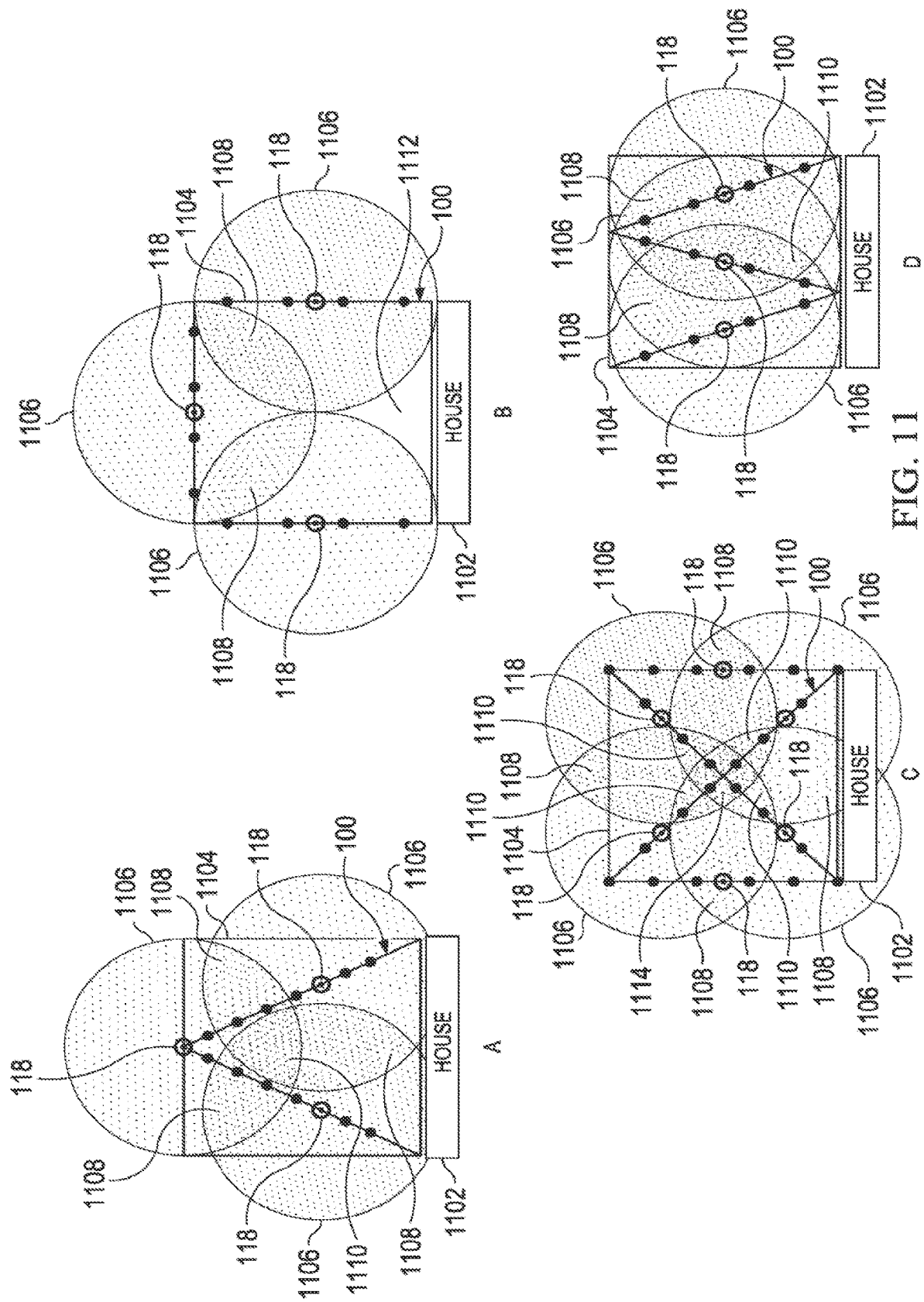
FIG. 11A is an overhead view of a plurality of repellent zones arranged in first plan according to aspects of the present disclosure.
FIG. 11B is an overhead view of a plurality of repellent zones arranged in first plan according to aspects of the present disclosure.
FIG. 11C is an overhead view of a plurality of repellent zones arranged in first plan according to aspects of the present disclosure.
FIG. 11D is an overhead view of a plurality of repellent zones arranged in first plan according to aspects of the present disclosure.

Referring now to FIG. 11A is an overhead view of a plurality of repellent zones arranged in first plan according to aspects of the present disclosure. FIGS. 11A-D are in the context of a house 1102 or other structure and a protected porch, patio, or other area 1104. As shown in FIG. 11A a lighting and repellant dispersal system 100 containing three repellant dispersion ports 118 is provided in a V-shape over the area 1104. By arranging the system 100 such that the repellent dispersion ports 118 are spaced somewhat evenly over the area 1104 circular zones of coverage 1106 cover substantially all of the area 1004. There are some areas 1108 overlapped by two zones 1106 and one area 1110 overlapped by three zones 1106.

FIG. 11B is an overhead view of a plurality of repellent zones 1106 arranged in second plan according to aspects of the present disclosure. Here the system 100 is installed such that the repellent dispersion ports 118 are arranged at or near the perimeter or outer edge of the area 1104. There is less overlap in this configuration but each repellent dispersion port 118 may be effective within its own zone 1106 such that overlap is not needed. Additionally, the total area protected by the three repellent zones 1106 is larger and actually extends beyond the area 1104. As illustrated, using three repellent dispersion ports 118 at the perimeter of the area 1104 leaves a small area 1112 near the house 1102 that is relatively unprotected. However, the repellent zones 1106 that surround this area 1112 may provide a sufficient "wall of coverage" that pests do not enter the area 1112.

Referring now to FIG. 11C an overhead view of a plurality of repellent zones 1106 arranged in a third plan according to aspects of the present disclosure is shown. Here the system 100 is arranged in an X-pattern with four active repellent dispersion ports 118 arranged in a square offset from the outside of the area 1104. Here it can be seen that there are no "dead zones" and the protected zones 1106 extend beyond the edge of the area 1104 in every direction. Some areas 1108 are overlapped by two zones 1106 while others 1110 are overlapped by three, and others 1114 by four. It can also be seen that there are two idle repellent dispersion ports 118 on left and right sides of the area 1104. Thus, it should be appreciated that not all ports 118 may need to be active to provide desired repellent performance.

Referring now to FIG. 11D is an overhead view of a plurality of repellent zones 1106 arranged in third plan according to aspects of the present disclosure is shown. FIG. 11D illustrates another way of deploying the system 100 when only three dispersion ports 118 are provided (or active). In this application, the system 100 is installed in a "zig-zag" pattern over the area 1104 with the ports 118 spaced roughly in a line laterally across the area 1104. The zones 1106 provide full protection over the area 1104 including some double protected zones 1108 and one triple protected zone 1110 near the center of the area 1104.

It will be appreciated that any of the systems described herein (e.g., 100, 400, 700, 800, 900) can be adapted to cover a wide variety of areas. The protected areas are not necessarily square in every case (as in the examples of FIGS. 11A-D) but can have a wide variety of geometric shapes. Additionally, the areas protected may vary substantially in size but can be protected and lighted by inclusion of additional dispersion ports and/or use of multiple strings of dispersion ports, lights, and clip-on devices as disclosed herein.

Figure 12A:
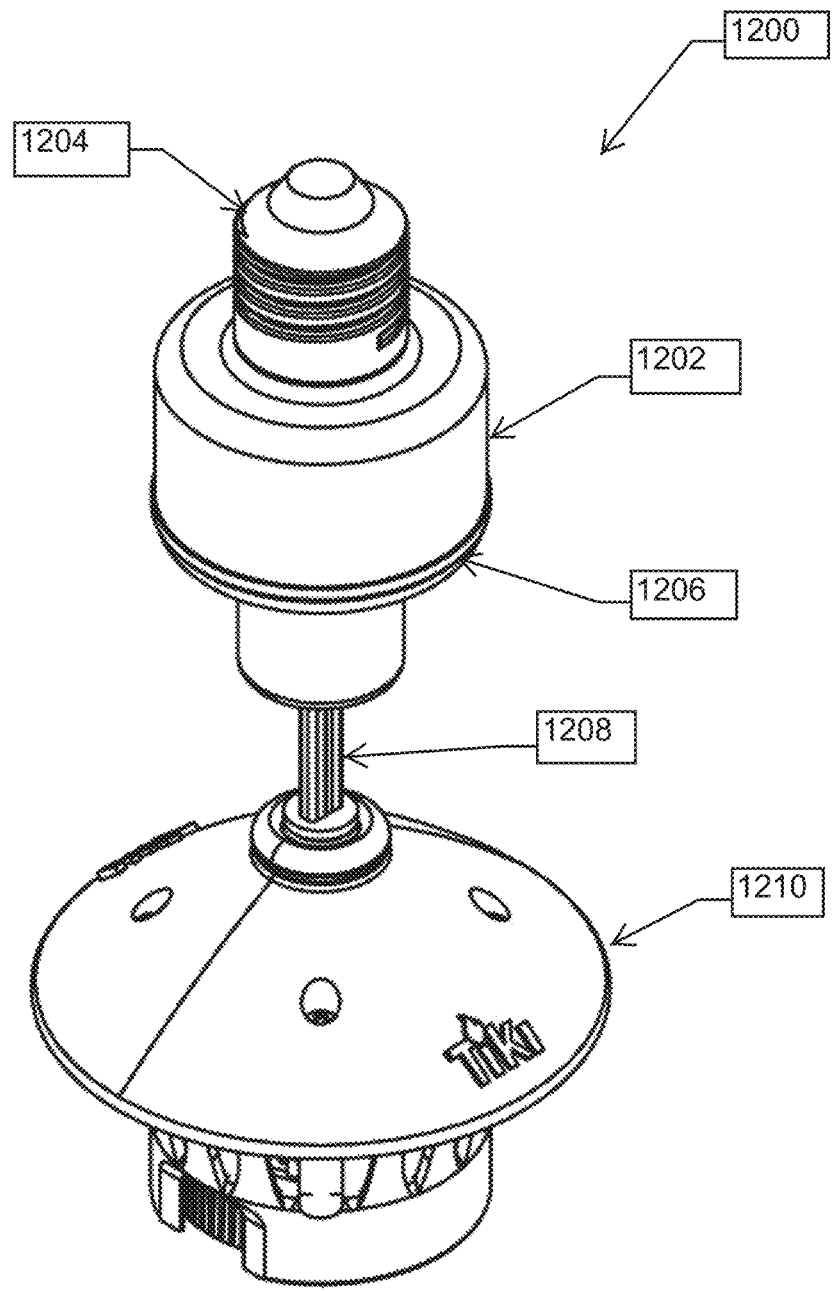
FIG. 12A is a perspective view of an embodiment of a retrofit assembly according to aspects of the present disclosure.
Figure 12B:
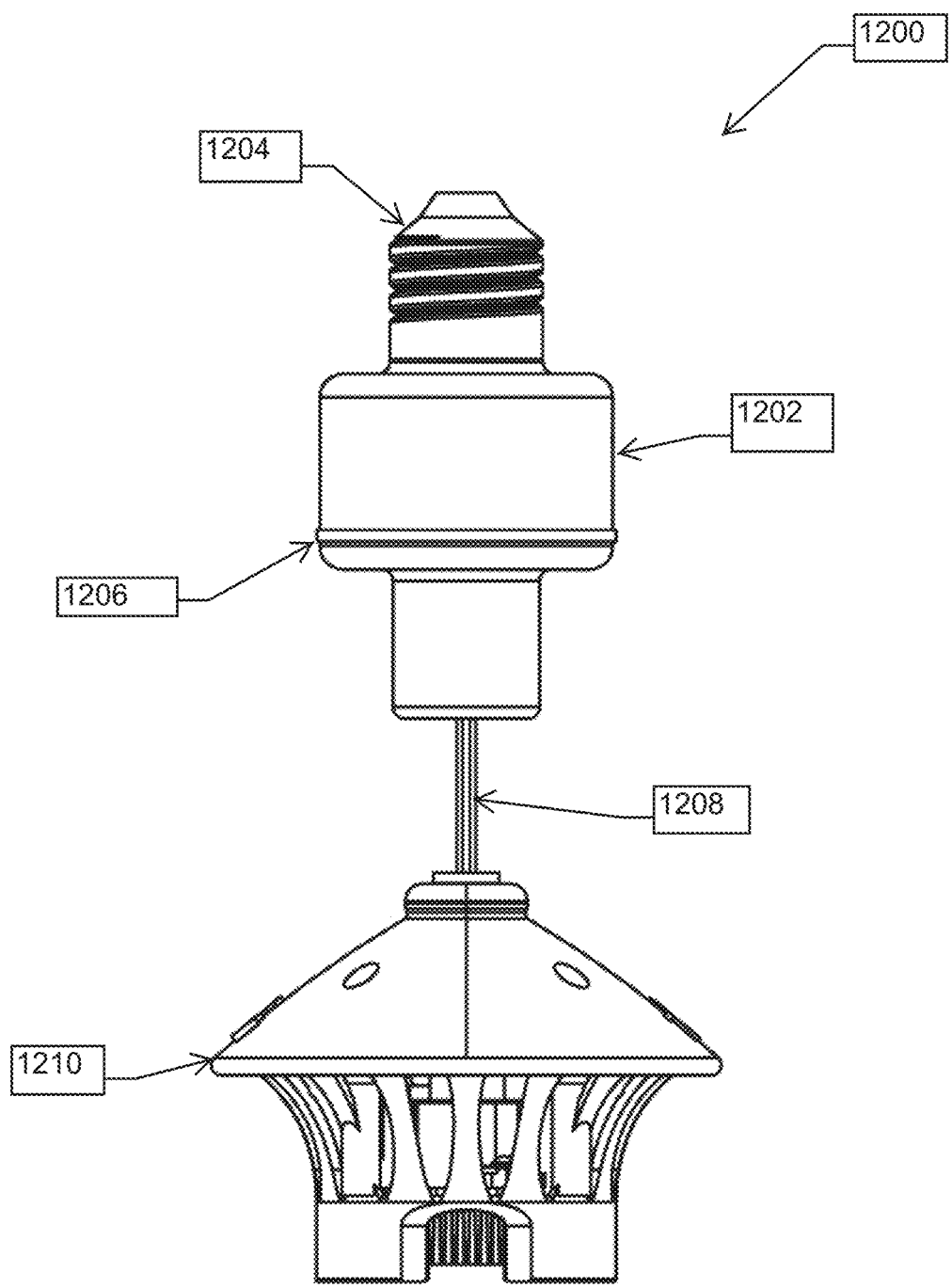
FIG. 12B is a side view of the retrofit assembly of FIG. 12A.

Referring now to FIG. 12A is a perspective view of an embodiment of a retrofit assembly 1200 according to aspects of the present disclosure is shown. FIG. 12B is a side view of the retrofit assembly 1200. The retrofit assembly 1200 may be utilized to provide repellent features to a light string previously outfitted only with light bulbs (e.g., incandescent, LED, etc). In another aspect, the retrofit assembly 1200 provides an additional mechanism for a power cord to supply power to a heating receptacle (e.g., receptacle 123 discussed above or a heating receptacle 1210 as shown in FIGS. 12A-12B) by fitting to the power cord in a similar fashion as a light bulb.

The retrofit assembly 1200 may comprise a receiver housing 1202 having a socket connector 1204 on a top end and a power cord 1208 exiting on or near a bottom end. The power cord 1208 transfers electrical power from the receiver housing 1202 to the heating receptacle 1208. The heating receptacle 1208 may be suspended from the receiver housing 1202 by the power cord 1208 in a spaced apart manner (e.g., as shown). In other embodiments, wiring between the receiver housing 1202 and the heating receptacle is completely internal such that the heating receptacle 1210 and the receiver housing are a unitary structure.

The socket connector 1204 may comprise an E26/27 or S19 type connector or another light socket connector as known in the art. Power drawn from a light bulb receptacle on a power cord or elsewhere may be selectively passed to the heating receptacle 1210 based on electronics within the receiver housing 1202.

In some embodiments, the receptacle housing 1210 comprises an indicator ring 1206, which may comprise an LED. The indicator ring 1206 may illuminate when power is being supplied at the socket connector 1204 and is being passed down to the heating receptacle 1210.

Figure 13A:
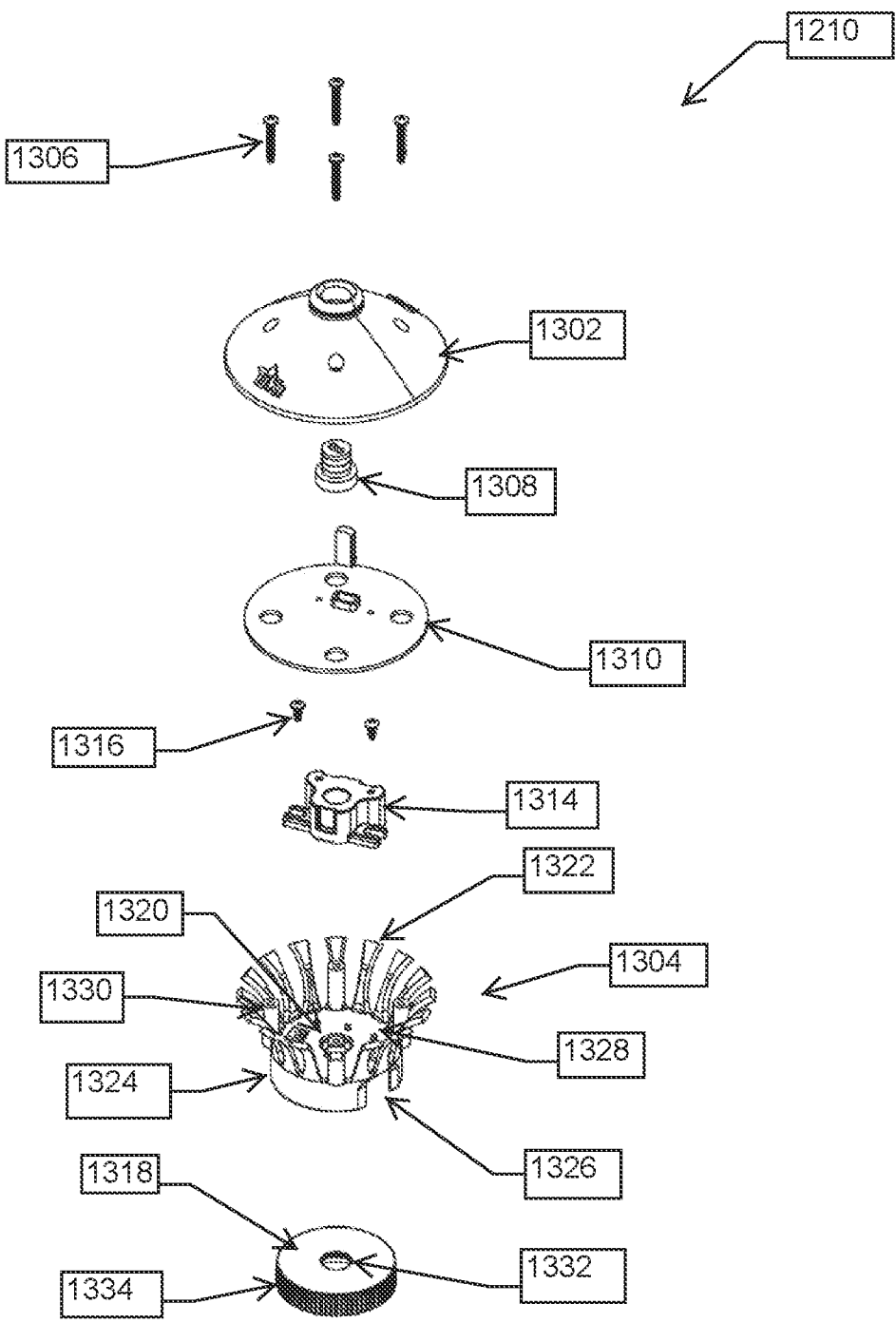
FIG. 13A is an exploded view of a heating receptacle according to aspects of the present disclosure.
Figure 13B:
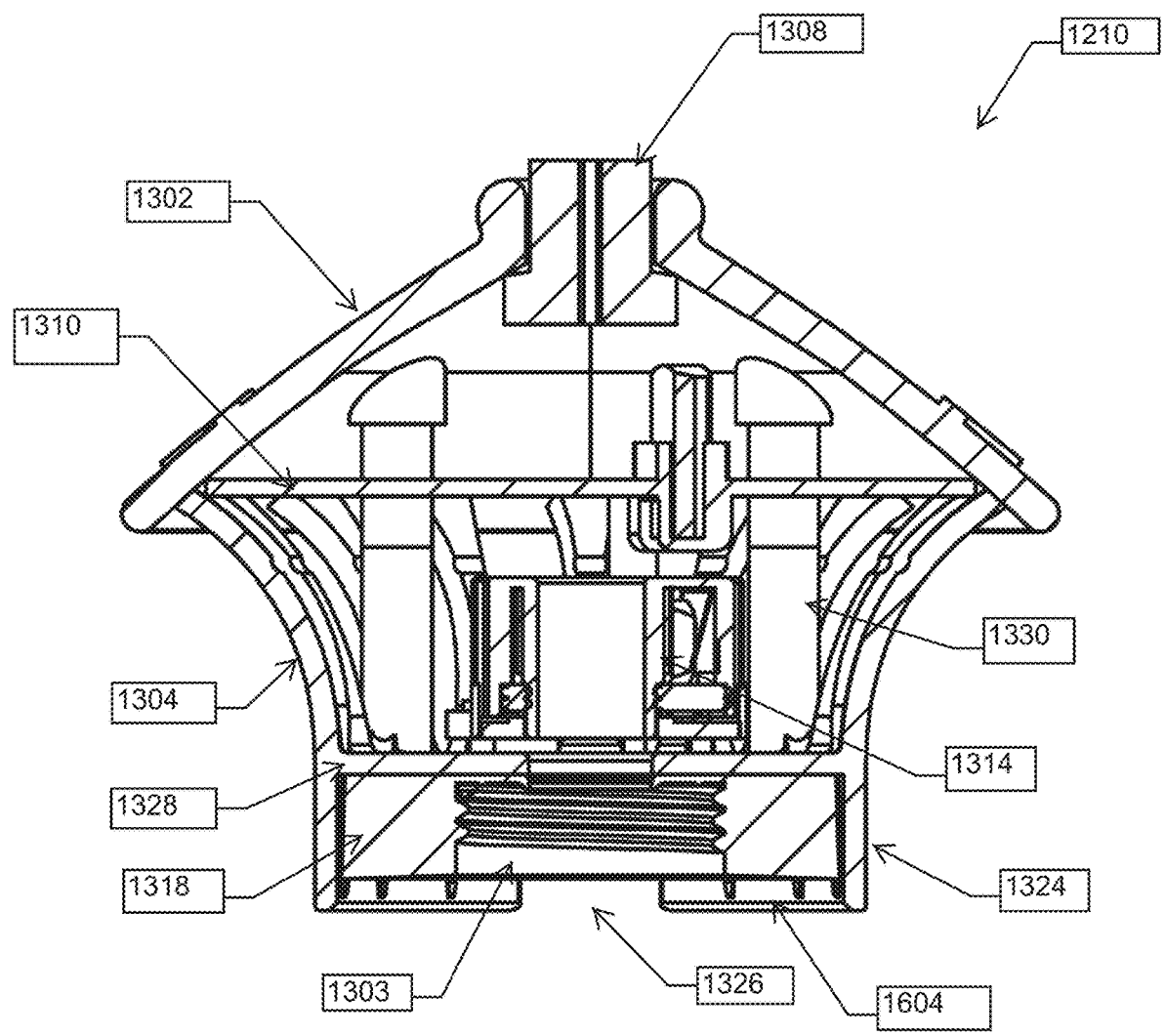
FIG. 13B is a cutaway view of a heating receptacle of FIG. 12A.

Referring now to FIG. 13A an exploded view of the heating receptacle 1210 is shown. FIG. 13B is a cutaway view of a heating receptacle 1210. It should be understood that the heating receptacle 1210 is exemplary. The retrofit assembly 1200 could also utilize heating receptacle 123 or similar, for example. Heating receptacle 1210 may comprise a top shell 1302 which may be conic or generally sloped (e.g., to shed water or for decorative purposes). The top shell 1302 may be secured to a base 1304 by one or more fasteners 1306. Fasteners 1306 may comprise screws that pass through the top shell 1302 to be received in the base 1304.

The power cord 1208 (not shown here) may pass into the heating receptacle 1210 and be retained by a bushing 1308. The bushing 1308 may comprise a rubber component or be formed of another elastomeric substance to provide a secure grip on the power cord and providing weather resistance.

Inside the heating receptacle 1210 the power cord may split into separate positive and negative leads (not shown here) and may pass through a bracket 1310 before connecting to a heating element 1314. The heating element 1314 may comprise a resistive heating element. It may be secured to the base 1304 via one or more fasteners 1316.

The base 1304 may comprise an upper ventilated portion 1322 connecting to a lower cylindrical sleeve 1324. A floor 1328 may be retained at the junction of the ventilated portion 1322 and the lower sleeve 1324, and may be affixed to either or both. In another embodiment, each of the upper ventilated portion 1322 and the lower sleeve 1324 affix to the floor 1328. One or more of the floor 1328, the upper ventilated portion, and the lower sleeve may have receptacles 1330 affixed thereto for receiving fasteners 1306.

The floor 1328 may define an aperture 1320 for admitting a wick into or near to the heating element 1314 for dispersal of repellents. When the heating receptacle 1210 is assembled, the ventilated portion 1322 surround the heating element 1314 to allow dispersal of repellent outside of the heating receptacle 1210. The heating element may be affixed to the floor 1328 on or near aperture 1320.

Figure 17:
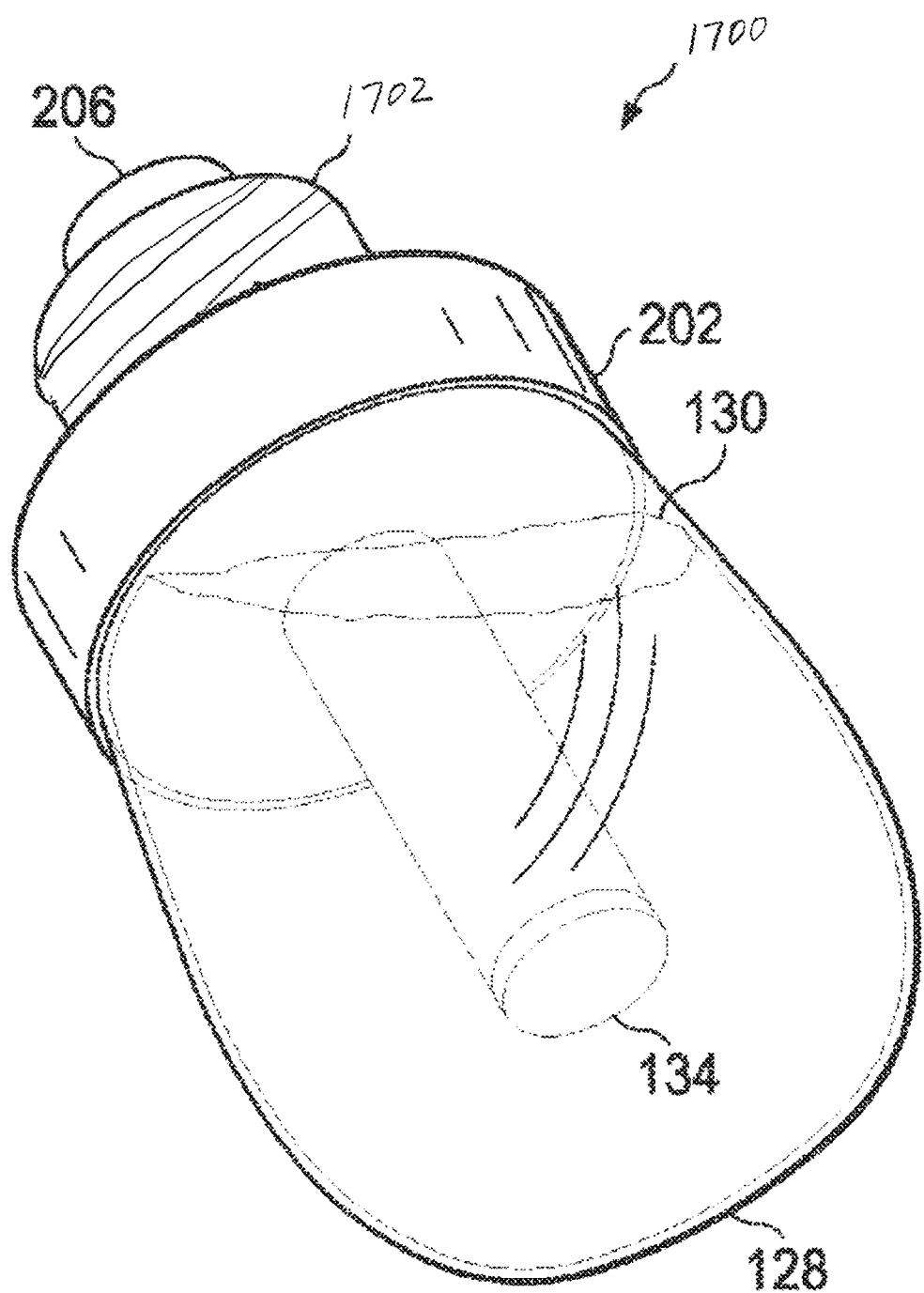
FIG. 17 is a perspective view of a repellent assembly pod for use with systems of the present disclosure.

A collar 1318 may be fitted into the lower sleeve 1324. The collar 1318 may be sized to fit into the lower sleeve 1324 and rotate freely. Tabs 1604 or other interference members inside the sleeve 1324 may prevent the collar 1318 from falling out, while still allowing for rotation of the collar. The collar 1318 may serve as the interface to a detachable repellent pod. To that end, collar 1318 may define a threaded fitting 1303. The fitting 1303 may selectively attached to a threaded repellent pod, such as that shown in FIG. 17. The repellent pod 1700 is substantially similar to the repellent pod 126 discussed above, but for the threaded fitting 1702 to fit unto the fitting 1303 of collar 1318.

Since the collar 1318 is free to rotate in the sleeve 1324, the remainder of the retrofit assembly 1200 cannot be used as a grip to attach and detach the repellent pod 1700. An opening or window 1326 may be defined in the sleeve 1324 to allow contact or grip with the collar 1318 Rotation of the repellent pod 1700 with respect to the collar 1318 (or vice versa) may then be achieved for attachment and detachment of the repellent pod 1700. The collar 1318 may have a knurled, ridged, or otherwise textured circumferential surface 1334 to increase purchase on the collar 1318. In some embodiments, more than one window 1326 may be provided in the sleeve 1324 (for example, two windows 180 degrees apart).

An aperture 1332 may be defined centrally through the collar 1318 over the fitting 1303 to allow the wick or 134 or top port 206 of repellent pod 1700 or similar into proximity of the heating element 1314.

Figure 14:
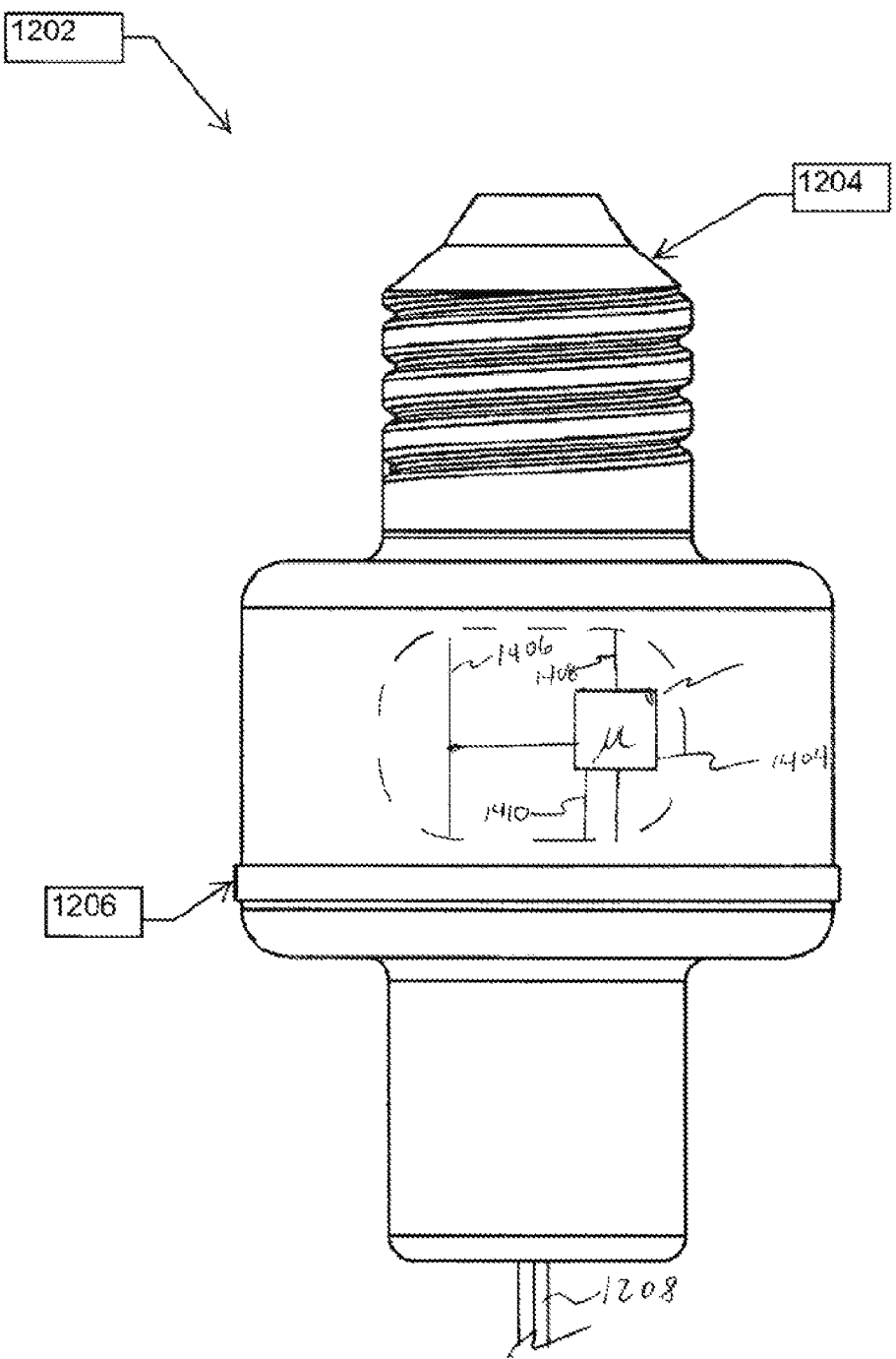
FIG. 14 is a side, partial cutaway view of one embodiment of a socket connector for use with systems of the present disclosure.

Referring now to FIG. 14 a side, partial cutaway view of one embodiment of a receiver housing for use with systems of the present disclosure is shown. The receiver housing 1202 may contain electronic components that allow power to be selectively supplied to the heating receptacle 1210 from the socket connector 1204. A negative lead 1406 and positive lead 1408 can be seen passing through the receiver housing 1202 (e.g., before they are joined together in power cord 1208). A microcontroller 1404 or other solid-state device may be wirelessly controlled to interrupt or pass power to the heating receptacle 1210. Thus the microcontroller 1404 functions as a remote controlled and solid state switch. The microcontroller 1404 may also illuminate indicator ring 1206 (e.g., via lead 1410) when power is being passed to the heating receptacle. The microcontroller 1404 can be any wireless capable chip or system that can receive simple on/off signals from a transmitter. It may contain an interpreted or separate antenna as is known in the art. Those of skill in the art should understand that the wiring in FIG. 14 (and other figures) is exemplary only and function and controls described herein could be implemented in a number of ways.

In other embodiments, the receiver housing 1202 is eliminated and the power cord 1208 may connect directly to the socket connector 1204. Such embodiments may contain the internal components of receiver housing 1204 in the heating receptacle 1210, or may lack the remote-control capability of those embodiments with the internal electronic components of the receiver housing 1204.

Figure 15:
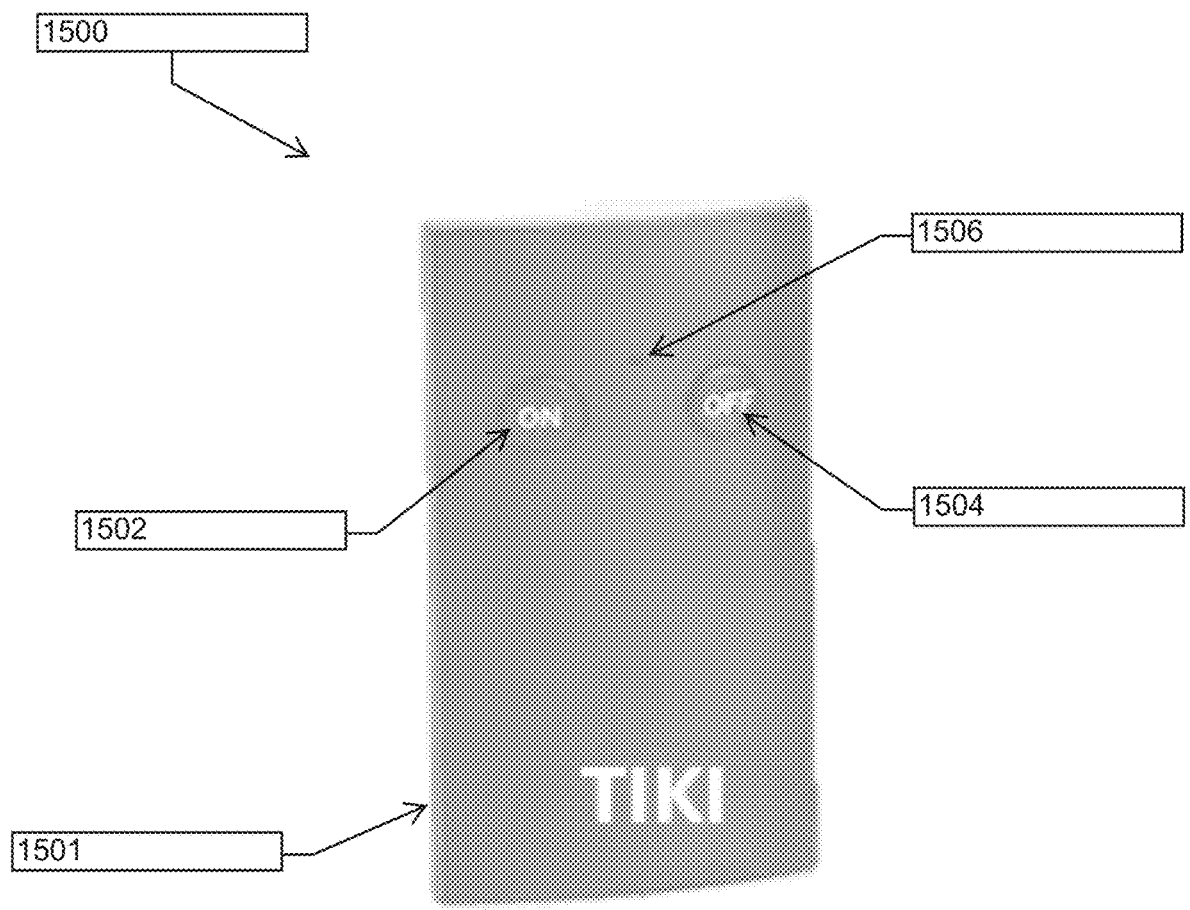
FIG. 15 is perspective view of a one an embodiment of a wireless remote control for use with systems of the present disclosure.
Figure 16:
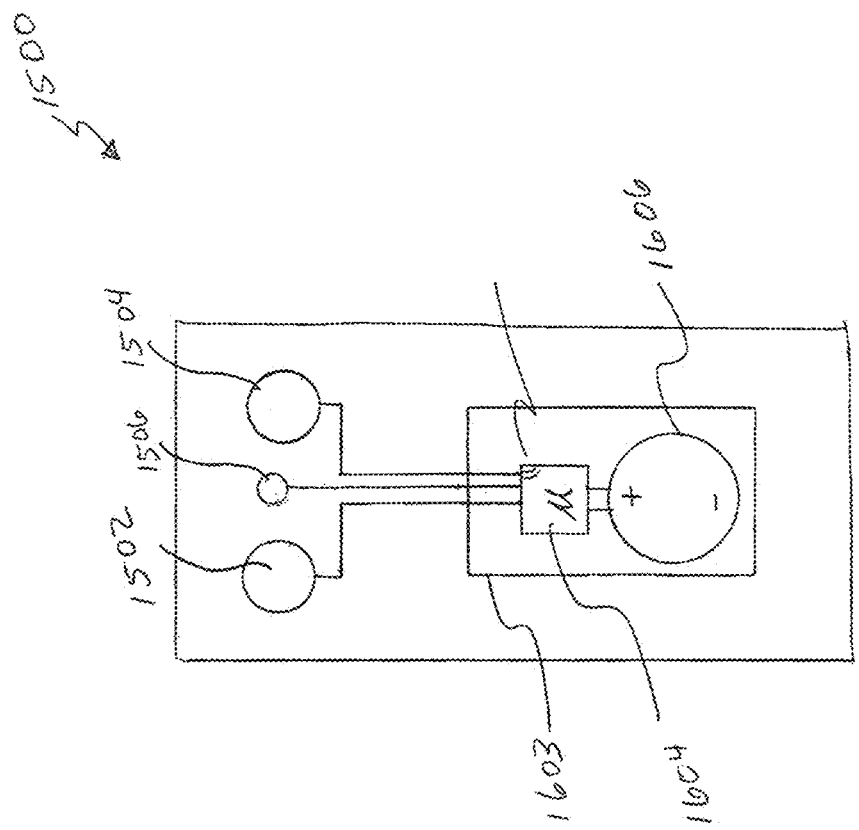
FIG. 16 is a simplified cutaway view of the wireless remote control of FIG. 15.

The microcontroller 1404 may receive signals from a number of devices. For example, it may be controlled by and provide responses or indications to a phone app via Bluetooth, Wi-Fi, or the like. Nearfield or wideband communication protocols may also be utilized. In some cases, a dedicated wireless remote control may be used. FIG. 15 is perspective view of a one embodiment of a wireless remote control 1500 for use with systems of the present disclosure. FIG. 16 is a simplified cutaway view of the wireless remote control of FIG. 15.

The remote 1500 may comprise an outer casing 1501 containing a circuit board 1603 with a power supply such as a button cell battery 1606. A microcontroller or other silicon 1604 chip device may take input from an on button 1502 and an off button 1504. In response, the microcontroller 1604 may send wireless commands to the retrofit assembly 1200 to turn on or off depending on the button pressed. The microcontroller 1604 may contain an internal antenna or may utilize a separate antenna on the circuit board 1603 or elsewhere. An indicator light 1506 may be visible outside the casing 1501 to confirm that signals are being sent from the remote 1500.

The remote 1500 may communicate with the retrofit assembly 1200 via radiofrequency protocols, as described. However, it may also be configured to communicate via infrared (IR), as is known in the art. In such cases, the retrofit assembly 1200 would be similarly configured to receive IR commands, as is known in the art. It should also be understood that a single remote 1500 may operate a plurality of retrofit devices such as the retrofit device 1200.

Figure 18:
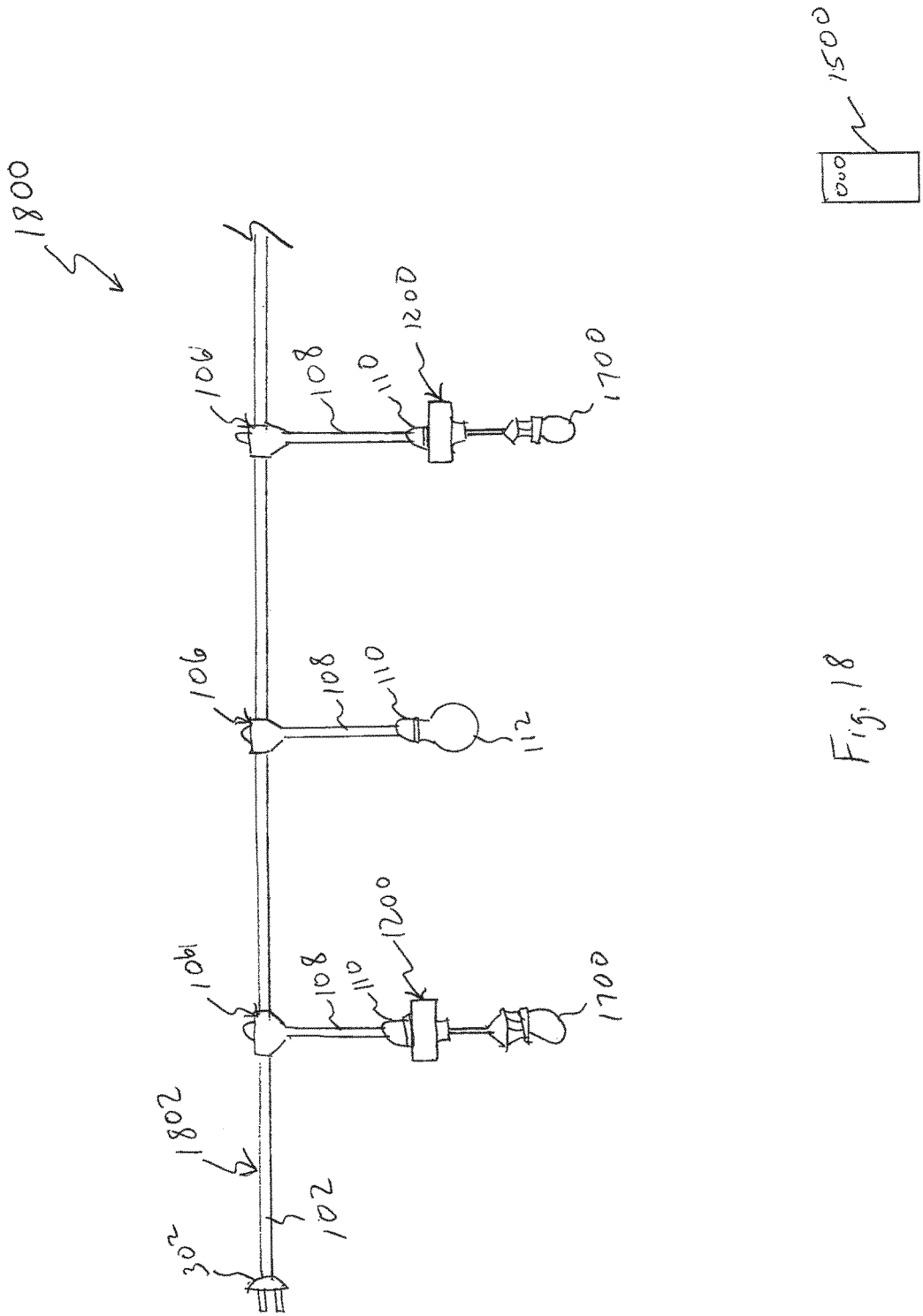
FIG. 18 is a side view of a retrofitted light string according to aspects of the present disclosure.

Referring now to FIG. 18, a retrofitted string light 1800 utilizing retrofit assemblies 1200 according to the present disclosure is shown. Unlike previous embodiments, a power cord 1802 does not have cord junctions fitted to permanently attached heating receptacles. Instead, the power cord 1802 has only cord junctions 106 providing transverse power cords 108 leading to light sockets 110 (and, in some cases, there is no transverse cord, the light socket attaching directly to the cord junction 106 and/or the cord 102).

Retrofit assemblies 1200 may be attached to some or all of the light sockets 110 in place of bulbs 112 for example. As can be seen, it is not necessary that all bulbs 110 be replaced. It may be desirable to replace only some of the plurality of bulbs 110 that would be used with a string light to allow for both repellency and lighting from the same retrofitted string light. Retrofit repellent assemblies 1200 may be spaced apart on the string 1802 (which is only partially shown, and would typically have many more sockets 110) such that overlapping zones of repellent coverage are provided (for example, as in FIG. 11, discussed above)

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number.

For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

The term "selective" or "selectively," unless otherwise indicated, is taken to mean that the operation or function is capable of being performed by the structure or device in reference, but the operation or function may not occur continuously or without interruption. Furthermore, a selective or selectively performed operation may be one that the user or operator of a device or method may choose whether or when to perform, but the function or operation is nevertheless fully operative on or within the relevant device, machine, or method and the same includes the necessary structure or components to perform such operation.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A repellent assembly comprising:
    a receiver housing with a light socket connector;
    a heating receptacle electrically connected to the receiver housing, the heating receptacle having an internal electric heater and a fitting for selectively receiving a repellent pod assembly in a position proximate the electric heater to heat the repellent pod assembly to disperse repellent; and
    a remote-controlled switch in the receiver housing that switches power from the light socket connector to the heating receptacle.

2. The repellent assembly of claim 1, wherein the heating receptacle further comprises:
    a body defining a sleeve; and
    a collar rotatably fitted into the sleeve and defining the fitting for selectively receiving the repellent pod assembly in the position proximate the electric heater to heat the repellent pod assembly to disperse repellent.

3. The repellent assembly of claim 2, further comprising a window defined in the sleeve allowing user contact with the collar.

4. The repellent assembly of claim 3, wherein the collar has a textured outer circumferential surface contactable through the window.

5. The repellent assembly of claim 1, further comprising a length of power cord connecting the heating receptacle to the receiver housing.

6. The repellent assembly of claim 1, wherein the remote-controlled switch comprises a solid state switch.

7. The repellent assembly of claim 6, wherein the solid-state switch comprises a wireless communications capable microcontroller.

8. The repellent assembly of claim 7, further comprising a remote control provide communication to the microcontroller to power on and power off the heating receptacle.

* * * * *